Jan. 19, 1960   B. A. COUSINO   2,921,787
ENDLESS TAPE REEL
Filed Dec. 28, 1956   6 Sheets-Sheet 1
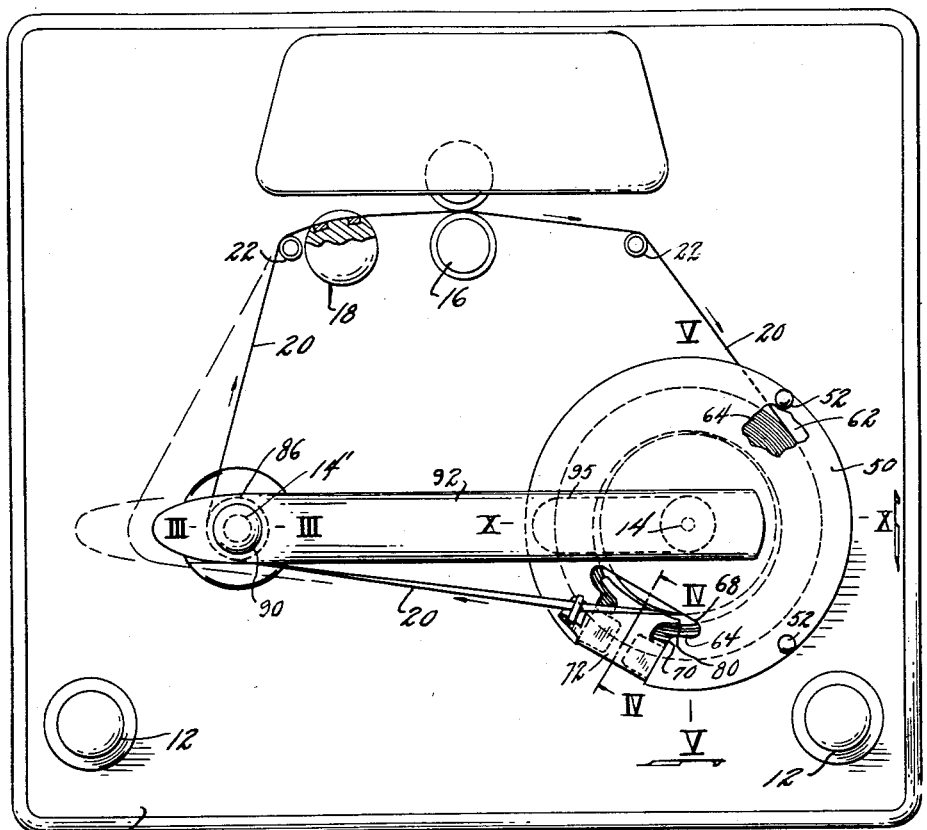
FIG-1-
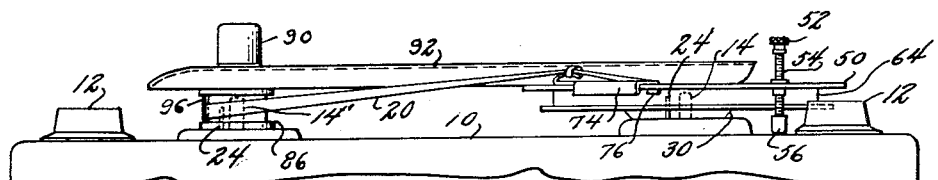
FIG-2-
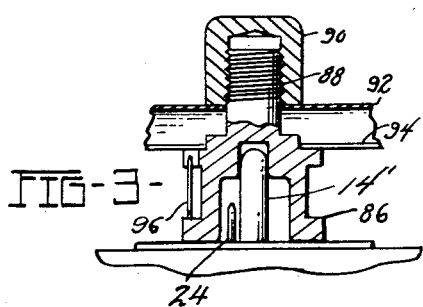
FIG-3-
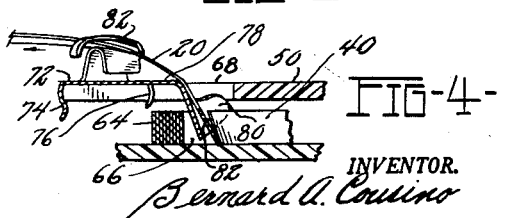
FIG-4-
INVENTOR.
Bernard A. Cousino
BY
McCoy, Greene & TeGrotenhuis
his attorneys

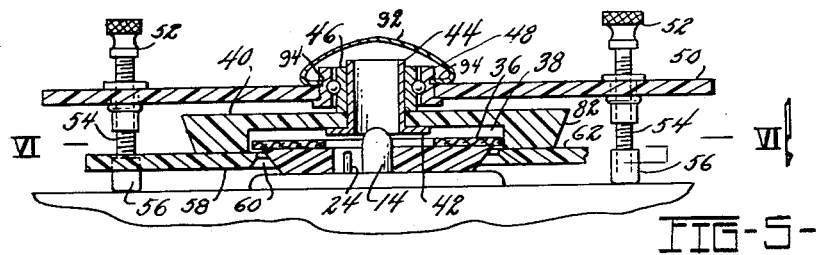
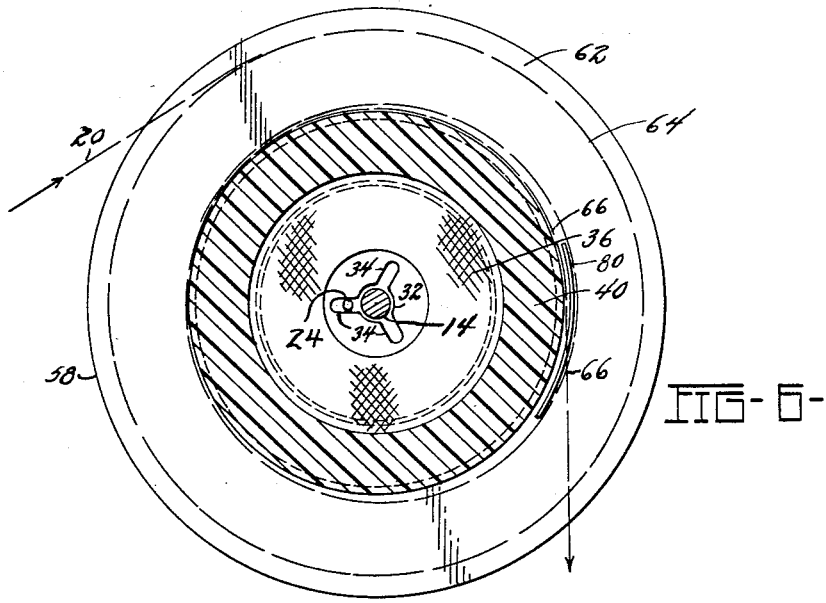
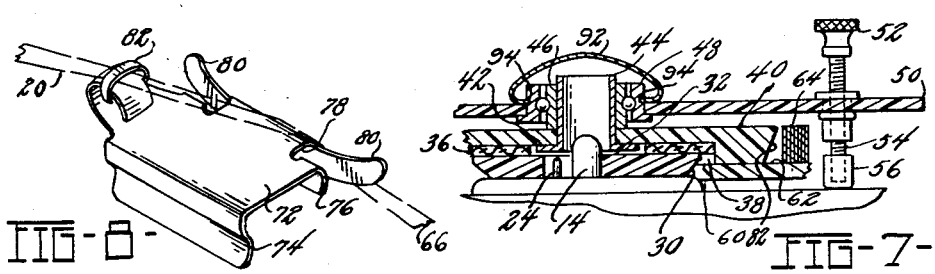
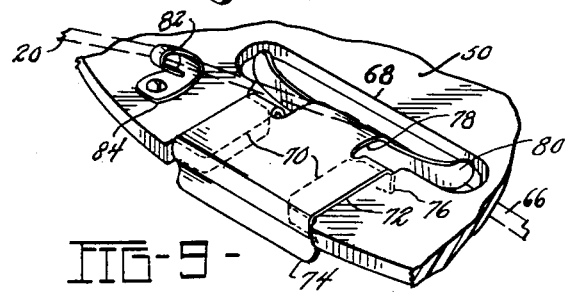

Jan. 19, 1960    B. A. COUSINO    2,921,787
ENDLESS TAPE REEL

Filed Dec. 28, 1956    6 Sheets-Sheet 3

INVENTOR.
Bernard A. Cousino
BY
McCoy, Greene + LeGrotenhuis
his attorneys

Jan. 19, 1960
B. A. COUSINO
2,921,787
ENDLESS TAPE REEL
Filed Dec. 28, 1956
6 Sheets-Sheet 4
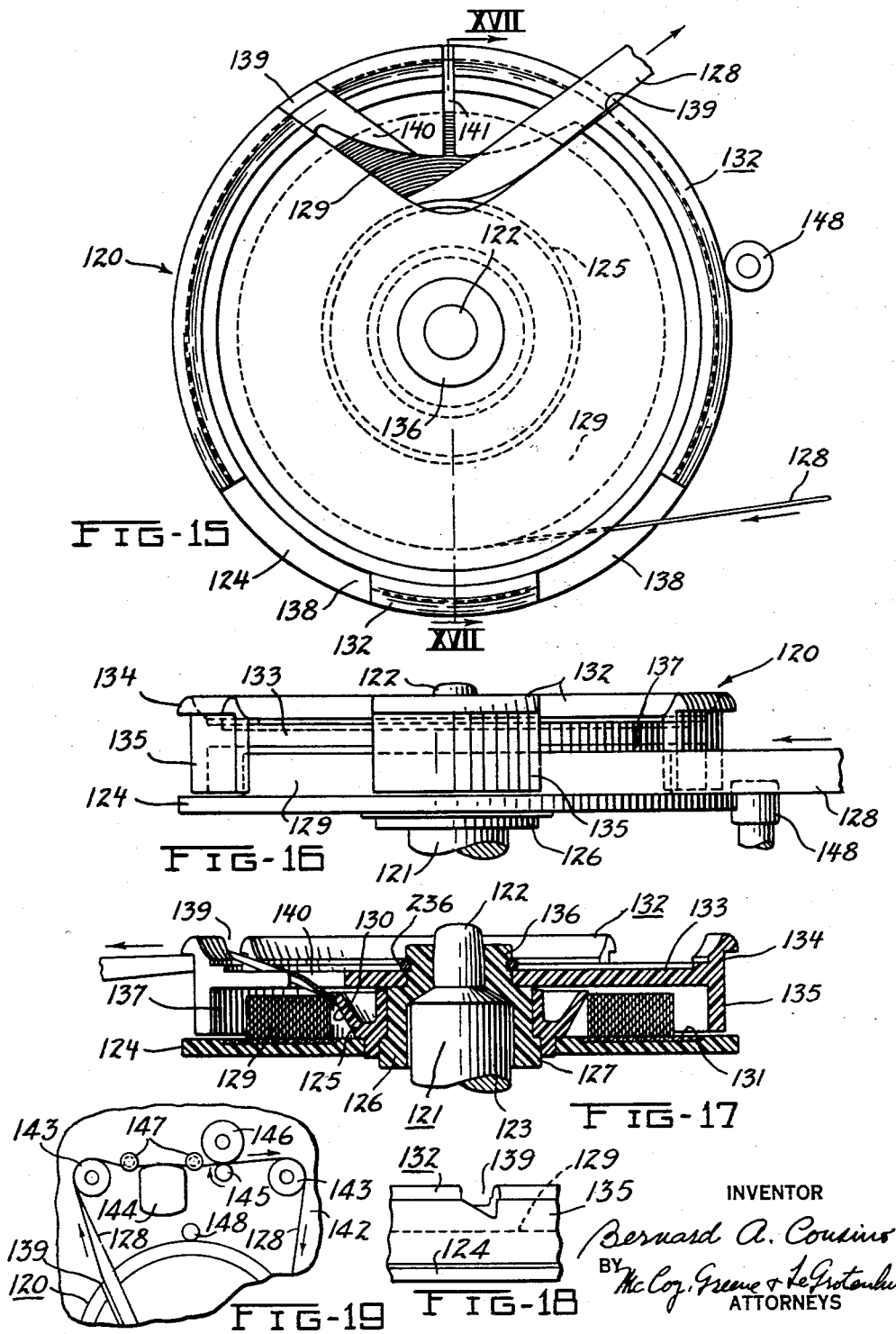
INVENTOR
Bernard A. Cousino
BY McCoy, Greene & LeGrotenhuis
ATTORNEYS Jan. 19, 1960 B. A. COUSINO 2,921,787
ENDLESS TAPE REEL
Filed Dec. 28, 1956 6 Sheets-Sheet 5
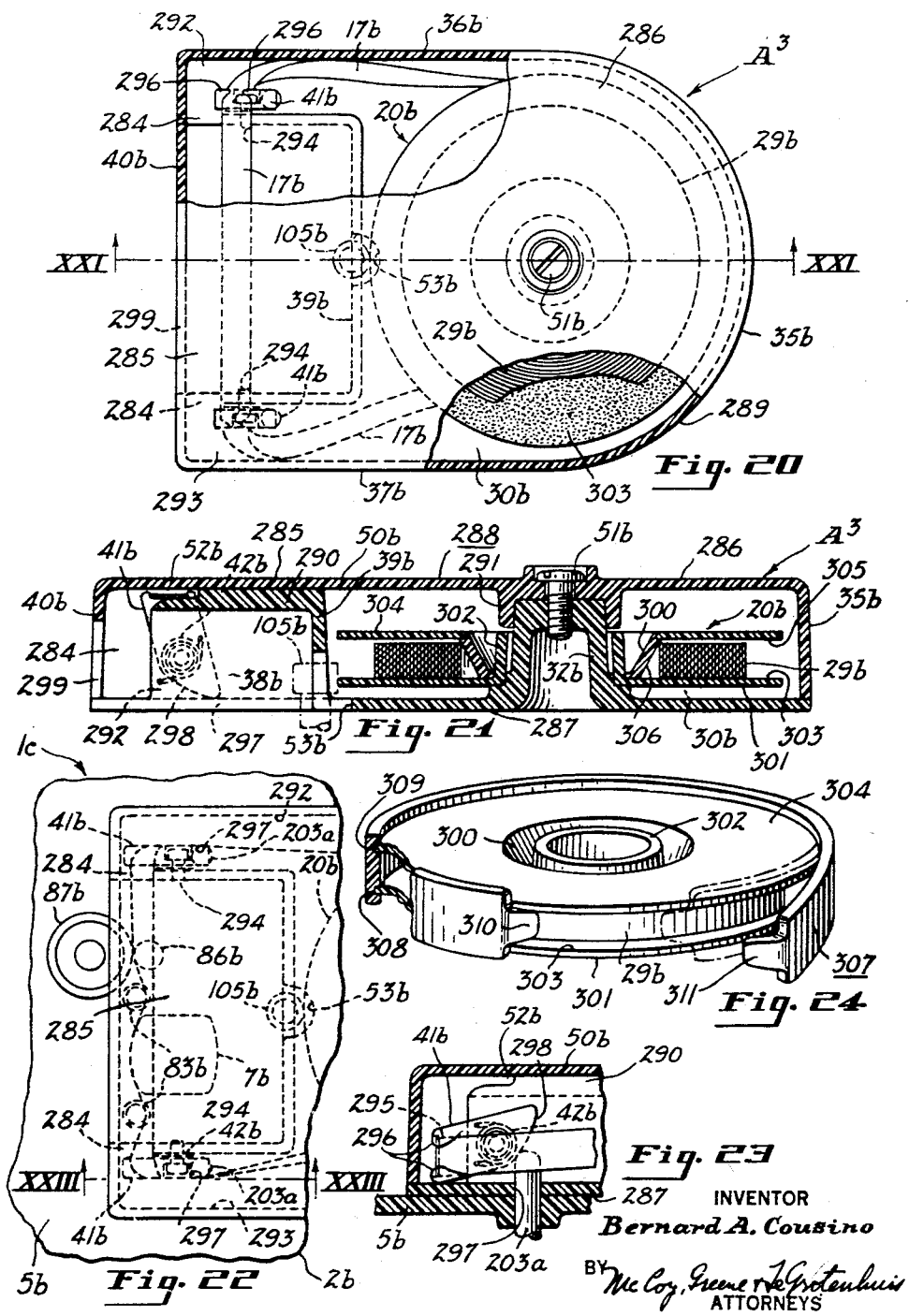
INVENTOR
Bernard A. Cousino
BY McCoy, Greene & Te Grotenhuis
ATTORNEYS Jan. 19, 1960 B. A. COUSINO 2,921,787
ENDLESS TAPE REEL
Filed Dec. 28, 1956 6 Sheets-Sheet 6
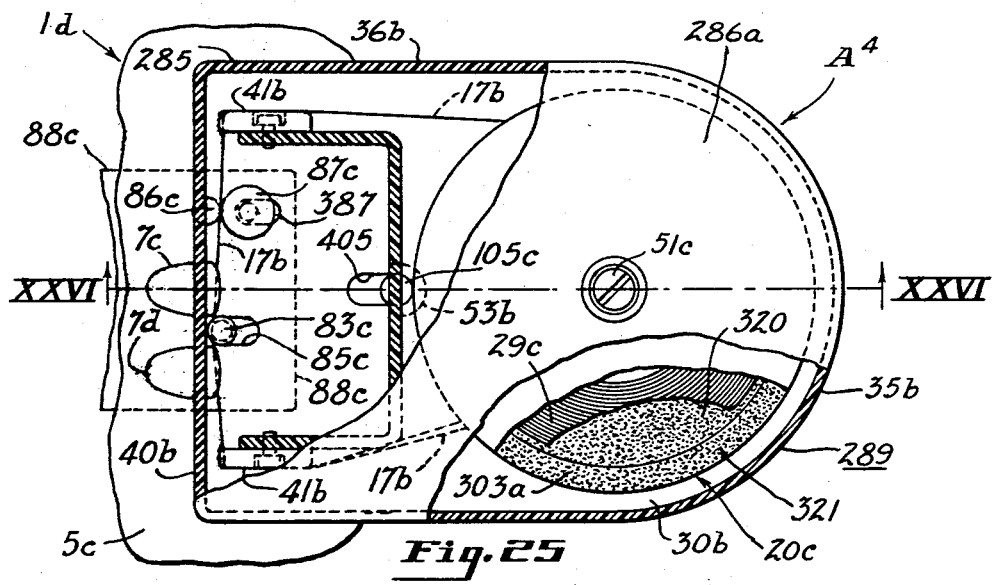
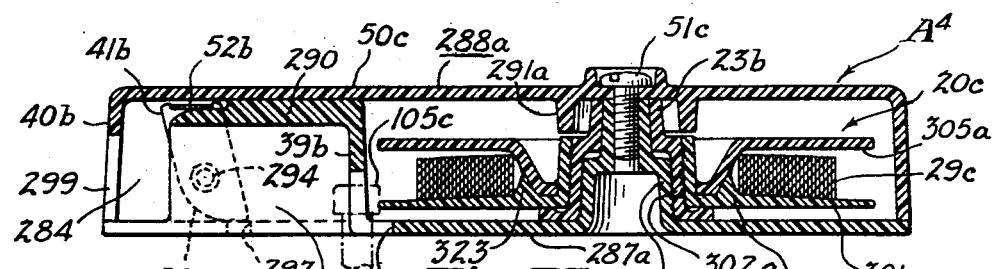
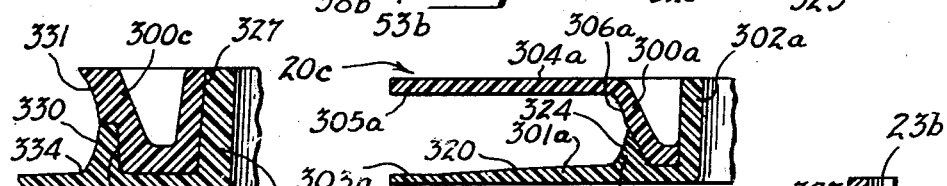
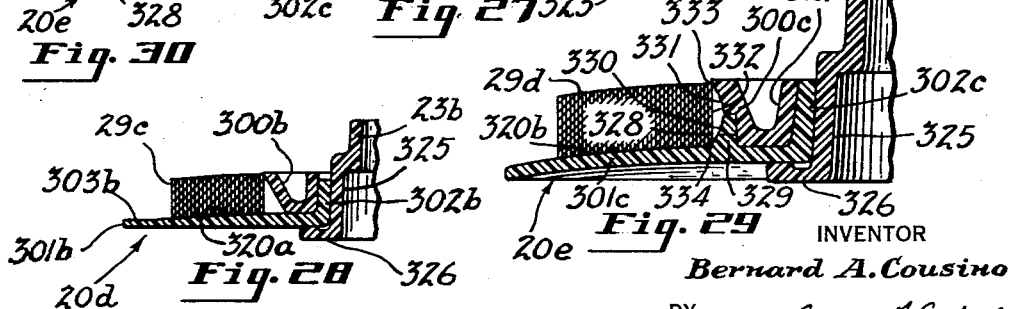
INVENTOR
Bernard A. Cousino
BY McCoy, Greene & TeGrotenhuis
ATTORNEYS ର
United States Patent Office 2,921,787
Patented Jan. 19, 1960

2,921,787

ENDLESS TAPE REEL

Bernard A. Cousino, Toledo, Ohio

Application December 28, 1956, Serial No. 631,199

14 Claims. (Cl. 271—2.18)

The present invention relates to reels for endless tapes, and means for handling endless magnetic sound tapes in connection with tape recording and/or reproducing devices.

This application is a continuation-in-part of my copending application, Serial No. 500,633, filed April 11, 1955, and a continuation in part of my copending application, Serial No. 535,899, filed September 22, 1955, now abandoned, which is a continuation-in-part of my abandoned application, Serial No. 459,313, filed September 30, 1954, which is a continuation-in-part of my abandoned application, Serial No. 324,449, filed December 6, 1952.

According to the present invention, a reel is provided having a rotatable generally horizontal plate for supporting a spirally wound coil of endless tape and having suitable guiding means, such as a round projecting axially tapering hub that increases in diameter in the direction of tape withdrawal, for holding the innermost cylindrical convolution of the tape coil in a predetermined position so that the coil may rotate about its vertical axis. Each incremental portion of an endless magnetic tape mounted on the reel may be guided and impelled in a closed path from the innermost coil convolution past the magnetic transducer head of a tape recorder and/or reproducer to the outermost coil convolution and through successive spirally wound convolutions back to the innermost convolution.

Suitable feeding means, such as a pair of engaging motor-driven feed rollers, may be employed to pull the tape from the reel at a substantially constant linear speed. Such feed rollers may be the sole means for rotating the reel and for feeding the endless tape to and from the reel. The tension applied to the tape by the feed rollers will cause sufficient friction between the tape and the tape-engaging portions of the reel to rotate the reel at the desired speed where the reel is provided with the tapered hub of the present invention.

The tape-receiving reel of the present invention may include a generally frusto-conical hub that is rigidly connected to a generally horizontal coil-supporting plate. Best results are obtained where the hub is shaped to engage the top and bottom edge of the innermost cylindrical coil convolution and has a concave annular groove of curved cross section for guiding the tape out of the reel, whereby the rounded tapered outer end portion of the hub increases in radius in the direction of tape withdrawal and the inner portion of said hub tapers in the opposite direction. If desired, generally horizontal coil-supporting discs or plates may be rigidly connected to both ends of the round axially tapered hub so that the reel will function effectively even when turned upside down.

According to the present invention, the tape-supporting surfaces of the reel are coated with a thin, uniform and continuous film of colloidal graphite deposited from dispersion in liquid. Such a graphite film provides an electrically conductive layer which substantially reduces the buildup of static charges between convolutions of the coil engaging said graphite film and reduces the friction between said convolutions. Where the reel has two horizontal plates, the tape-engaging surfaces of both plates are coated with graphite.

By the use of a colloidal graphite film on the endless tape reel, the length of tape which can be effectively handled on the reel is substantially increased. Tapes more than three-hundred feet in length can be handled on the reels of the present invention where the reels are caused to rotate solely by the feed rolls that engage the tape. Where longer tapes are used, it is often desirable to provide auxiliary means in addition to the main feed rolls for driving the rotating portions of the reel. Such auxiliary driving means preferably drives the rotating portions of the reel engaging the innermost convolution of the tape coil at an average linear speed slightly less than the average peripheral speed of the innermost convolution.

If desired, an adjustable friction driving connection may be provided between the hub driving means and the hub or plate of the reel to permit adjusting the amount of slip in accordance with the size of the tape coil or the size of the reel and to permit rotation of the hub at a speed greater than the speed it would normally be driven by said driving means whenever the tape leaving the innermost convolution of the coil is under substantial tension. If desired, such driving connection may be adjusted so that the auxiliary driving means is ineffective and the reel is rotated solely by the main feed rollers.

An object of the invention is to provide a reel for effectively receiving and delivering an endless strip of tape, maintaining the tape in orderly storage, and feeding the same smoothly and continuously.

A further object of the invention is to provide an endless tape reel which will operate effectively when operated in a normal or in an inverted position.

Another object of the invention is to provide a simple and economical reel which may readily be loaded and unloaded and which may readily be mounted on various styles and types of recording and reproducing apparatus.

A further object of the invention is to provide means for feeding a thin smooth endless strip of magnetic-coated tape or the like from the innermost convolution of a spiral coil and to the outermost convolution thereof at a uniform speed with a minimum amount of friction between adjacent convolutions, with a minimum amount of damage to the tape, and with a substantially uniform pull on the tape.

Another object of the invention is to provide a smooth and effective feeding mechanism for high fidelity recording and reproducing devices.

Other objects, uses and advantages of the present invention relating to the arrangement, operation and functions of the related elements of the structures disclosed, to various details of construction, to combinations of parts and to economies of manufacture, will become apparent to those skilled in the art upon consideration of the following description and appended claims, reference being had to the accompanying drawings forming part of this specification wherein like reference characters designate corresponding parts in the several views.

Referring to the drawings:

Figure 1 is a top plan view of a tape recording machine having a reel of the present invention incorporated therewith;

Figure 2 is a fragmentary front elevational view of the machine shown in Fig. 1 showing the reel and the endless tape carried thereby in operating position;

Figure 3 is a fragmentary vertical sectional view taken substantially on the line indicated at III—III in Fig. 1;

Figure 4 is a fragmentary vertical sectional view taken substantially on the line indicated at IV—IV in Fig. 1;

Figure 5 is a vertical sectional view of the reel taken on the line V—V of Fig. 1, the tape being omitted;

Figure 6 is a horizontal sectional view taken substantially on the line VI—VI of Fig. 5;

Figure 7 is a fragmentary vertical sectional view similar to Fig. 5 and with parts broken away showing the tape in operating position;

Figure 8 is a perspective view of the tape guide which directs the feed of the tape from the reel, the position of the tape being shown in dotted lines;

Figure 9 is a fragmentary perspective view showing a modified form of tape guide in reel mounted position on the cover plate;

Figure 15 is a top plan view of a modified form of endless tape reel;

Figure 16 is a side elevational view of the reel of Fig. 15;

Figure 17 is a vertical sectional view taken on the line XVII—XVII of Fig. 15;

Figure 18 is a fragmentary side elevational view of the reel taken substantially on the line indicated at XVIII—XVIII in Fig. 15;

Figure 19 is a fragmentary top plan view of a magnetic tape recording and reproducing mechanism employing the magazine reel of Fig. 15;

Figure 20 is a top plan view with parts broken away and shown in horizontal section showing a removable magazine or cartridge in which is mounted a modified form of tape reel, the operating position of the optional reel-driving roller being shown in dot-dash lines;

Figure 21 is a longitudinal vertical sectional view on a larger scale taken substantially on the line indicated at XXI—XXI in Fig. 20, the optional reel-driving roller being shown in dot-dash lines;

Figure 22 is a fragmentary top plan view showing the magazine of Figs. 20 and 21 in a predetermined operating position on a recording and/or reproducing mechanism, the tape-feeding rollers, the tape guide pins, and the optional reel-driving roller being shown in their operating positions during feeding of the tape;

Figure 23 is a fragmentary longitudinal vertical sectional view taken substantially on the line indicated at XXIII—XXIII in Fig. 22 and on a larger scale;

Figure 24 is a perspective view with parts broken away and shown in section of the tape reel shown in Figs. 20 to 23 and the expansible member which is attached to the reel when it is not in use in a magazine or cartridge, the normal position of said expansible member being shown in dot-dash lines;

Figure 25 is a top plan view on a reduced scale with parts broken away and parts shown in section of a magnetic tape recording and reproducing mechanism employing a modified form of magazine in which is mounted a modified form of tape reel similar to the reel of Figs. 20 and 21, the magazine being shown in its normal operating position with the tape lowered and being fed over the magnetic heads;

Figure 26 is a longitudinal vertical sectional view similar to Fig. 21 and taken substantially on the line indicated at XXVI—XXVI in Fig. 25 but with the tape retracted showing the magazine when the tape guides are in their uppermost positions wherein the tape is completely enclosed;

Figure 27 is a fragmentary vertical sectional view of the tape reel of Figs. 25 and 26 on a larger scale;

Figure 28 is a fragmentary vertical sectional view similar to Fig. 27 and on a smaller scale showing a modified form of tape reel;

Figure 29 is a fragmentary vertical sectional view similar to Figs. 27 and 28 showing another modified form of tape reel; and Figure 30 is a fragmentary vertical sectional view showing a portion of the reel of Fig. 29 on a larger scale.

Figure 10:
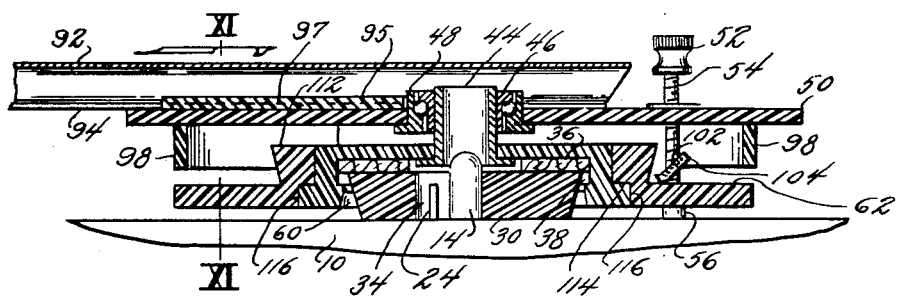
Figure 10 is a vertical sectional view similar to Figure 5 showing a modified form of tape carrying reel construction.
Figure 11:
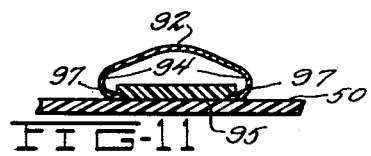
Figure 11 is a fragmentary vertical sectional view taken substantially on the line indicated at XI—XI in Fig. 10.
Figure 13:
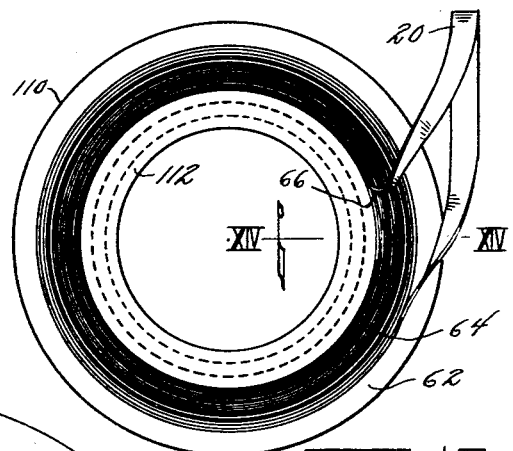
Figure 13 is a top plan view of a tape-carrying reel unit embodied in the construction disclosed in Fig. 10.
Figure 14:
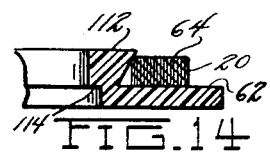
Figure 14 is a fragmentary vertical sectional view taken substantially on the line indicated at XIV—XIV in Fig. 13.

Heretofore magnetic tape recorders have employed two reels wherein the tape is fed from one reel through a magnetic pick-up mechanism and wound upon a second reel. Feeding the tape in this manner is undesirable since the tape must be rewound on a single reel before the tape is reused and the angular speed of the reels must be continually changing to maintain feeding of the tape at a constant linear speed. It is also difficult to maintain the constant speed tape feed needed for high fidelity recording or reproduction since the force needed to pull the tape varies as the diameter of the tape coil on the reel varies.

According to the present invention a single reel is employed and as the tape is fed therefrom through the magnetic pick-up mechanism, it is delivered back to the same reel so that an endless tape may be employed and the message carried thereby may be continuously repeated so long as desired.

There is shown in Figs. 1 to 7 a tape recording device 10, embodying round control knobs 12 for controlling various functions of the mechanism, such as sound, volume, speed and the like. The recorder also includes a pair of vertical reel positioning spindles 14, 14', a tape driving mechanism 16 comprising a pair of motor-driven externally cylindrical feed rolls that rotate about vertical axes and a magnetic transducer head 18. An endless magnetic tape 20 of uniform width and thickness is pulled over the pick-up head 18 by the feed rolls 16 and is directed by guide posts or rollers 22 on the recorder 10. A pair of upright studs 14 and 14' are mounted on the recorder 10 and project above the flat top surface of the recorder. Reel driving pins 24 also project above said top surface adjacent the studs and rotate about the studs for driving a reel thereon, which reel can be mounted on either of the studs 14, 14'.

The reel of the present invention includes a flat horizontal circular disk or plate 30 providing a turntable having an axial aperture from which extends one or more radial slots 34. The plate is centered on the stud 14 and the driving pin 24 engages one of the slots 34, and thereby rotates the disk 30. The disk 30 is provided with a flat annular pad 36, cemented to its flat upper face, which pad is preferably a felt ring of uniform thickness and of a diameter to overhang the periphery of the disk 30. This pad serves as a clutch element, the operation of which will be more fully described hereinafter. The clutch plate 36 is normally housed within a circular recess or seat 38 in a flat annular hub plate 40. The hub 40 is mounted on a flange 42 of an annular bushing 44 extending coaxially with and above the vertical stud 14. This bushing 44 is fixed to a cylindrical inner race 46 of a roller bearing for rotation about a vertical axis, the outer race 48 of such bearing being fixed to a flat horizontal main or cover plate 50 providing the stationary top side of the magazine reel construction.

The plate 50 mounts a series of vertical thumb screws 52 having threaded shafts 54 of uniform diameter and terminal mounting pads 56 of greater diameter which engage the flat horizontal top or face plate of the recording mechanism 10. The thumb screws 52 may be rotated to cause the plate 50 to be lifted vertically away from the recorder 10. This in turn raises the roller bearing 46, 48 and in turn the bushing 44 carrying the hub 40. Therefore, the flat horizontal inner face of the seat 38 is lifted from the clutch plate 36 and the disk 30 may rotate with slippage between it and the hub 40, the degree of slippage variable from full drive to no driving of the hub 40. When the thumb screws 52 are adjusted so that there is no driving of the hub 40, the reel is rotatable solely by the feed rollers 16 and the friction between the tape and the reel.

The screws 52 by their rotation may so nicely adjust the distance between the compressible flat clutch plate 36 and the hub 40 that, as the hub 40 is gradually lifted away from the plate 30, the compression exerted on the clutch plate 36 is decreased and the slippage between it and the hub 40 may increase so that while the element 30 may be rotated at a constant speed by the spindle 14, the hub 40 may rotate at a slower rate of speed due to the control slippage in the clutch. This is an extremely important contribution to the art herein because the drive 16 on the recorder will impart a constant linear speed to the tape passing therethrough and the reel drive 14 also has a constant speed. However, the size and width of the spirally wound coil of tape on the reel may vary in each instance, and in order to regulate the possibility of slack developing in the tape between the drive 16 and the reel, the screws 52 may adjust the speed of the hub 40 to avoid the building up of any slack while at the same time allowing the tape to coil upon the reel without undue tension between the wraps thereof. Likewise when the plate 50 is adjusted toward the recorder 10, the sliding friction due to engagement of the clutch plate 36 with the hub 40 increases, and the hub 40 is thereby driven by the pin 24 through the plate 30 and the clutch 36 at an angular speed which depends upon the degree of compression on the plate 36. It is seen that the slip friction drive for the hub 40 may be manually regulated by manipulation of the screws 52.

The hub 40 carries a flat ring-shaped plate or platform 48 provided with a circular axial aperture 60 and a flat horizontal peripheral deck portion 62. The clutch plate 36 also overhangs the aperture 60 so that there is an assembled relationship between the driving and driven parts even when the reel is removed from the recorder. The flat deck 62 serves as a horizontal support for a flat spirally-wound roll or coil 64 having cylindrical convolutions containing the major portion of the tape 20. As the deck 62 is rotated, the endless tape 20 is fed from the inner periphery to the outer periphery of the coil 64 to freely rest on edge on said deck. Since the tape may be of any desired length, the coil 64 is limited in its size only by the chosen dimensions of the deck 62.

The delivery of the tape 20 from the coil 64 comprises a continuing unreeling from the innermost wrap or convolution 66, such being delivered through the slot 68 in the upper plate 50 which is elongated in a tangential direction. This slot 68 is the cross portion of a T-slot including a radial extension 70 from the portion 68 to the outer periphery of the plate 50.

Means are provided to aid the peeling of the tape from the innermost wrap 66 of the coil 64 in an orderly and continuous manner. To this end there is provided a stationary sheet metal spring clip 72 having opposed outer and inner flanges or fingers 74 and 76, respectively, gripping the two tongues formed on opposite sides of the T-slot between the outer marginal edge of the plate 50 and the radially outer edges of the slot 68. The sheet metal clip 72 is provided with a horizontal radial extension 78 that mounts an integral curved spatulate spring finger 80. The sheet metal finger 80 may be bent to conform generally to the shape of the hub 40 or the shape of the innermost convolution and projects downwardly below the upper surface of the tape coil between the innermost and next-to-the-innermost wraps of the coil. As the plate 58 and the coil 64 rotate, this finger 80 serves to peel off the tape from the innermost wrap of the coil, and such tape is directed upwardly and outwardly through the slot 68 and is further directed by a stationary guide 82, which may be an integral extension from the clip 72 as shown in Fig. 8.

In some devices the plate 58 will be rotated in one direction while in other devices it will be rotated in the opposite direction. The clip 72 is provided with curved fingers 80 extending in opposite directions, and, therefore, the clip as shown herein readily accommodates the flow of tape from the coil 64 whether wound clockwise or counterclockwise.

The hub 40 has a round axially tapered frusto-conical periphery which increases in diameter away from the plate 58 and aids in the movement of the tape from the coil. The tape 20 moving on to the reel forms the outer wrap of the coil 64 and then progresses inwardly and is finally removed from the coil, as guided by the finger 80, outwardly through the slot 68 and thence through the stationary guide 82 and therebeyond. In some instances it may be desired to provide the guide 82 on a separate clip element 84 attached to the cover plate 50 in spaced relation to the clip 72 as shown in Fig. 9.

As the tape 20 moves from the guide 82, it is conducted about an externally cylindrical grooved annular guide 86, which may be mounted in upright position on the spindle 14' remote from the reel carrying spindle 14. This cylindrical element 86 is provided with a vertical threaded extension 88, which coacts with a thumb nut 90 to lock a horizontally elongated rigid sheet metal arm therewith. The arm 92 is generally arcuate in cross section throughout its length and extends from the guide 86 beyond the drive spindle 14. The opposite side portions of the arm are turned inwardly to provide opposing edges 94 which engage in grooves in the outer race 48 of the roller bearing portion of the reel mounted on the drive spindle 14. The distance between the vertical studs or spindles 14, 14' vary greatly in different makes of recorders. By the construction herein the arm 92 has a slidable connection with the roller bearing and may slide horizontally in the grooves of the outer race 48 so that the guide 86 is axially seated on its respective stud. The arm 92 also serves as a stabilizing element for holding the top plate 50 against rotation and steadily upon its respective mount.

In mounting the device upon a recorder, the reel is seated upon the spindle 14 and the position of the arm 92 is then adjusted to register the element 86 coaxially with the remote spindle 14'. The tape 20 can then be threaded about the guide rolls 22, the drive 16 and the pickup 18. When the drive for the reel is started, the screws 52 may be adjusted to frictionally clutch the hub 40 with the plate 30, and the tape is then delivered from the reel about the circuit and back to the reel in a continuous and unending cycle.

The annular guide element 86 being hollow allows the drive pin 24 adjacent its spindle 14 to freely rotate therein without engaging or driving the element 86. Vertical pins 96 may bridge the annular groove about the element 86 maintaining the tape in position relative thereto even when slack develops in the reach of tape between its delivery from the reel and its return thereto.

Figure 12:
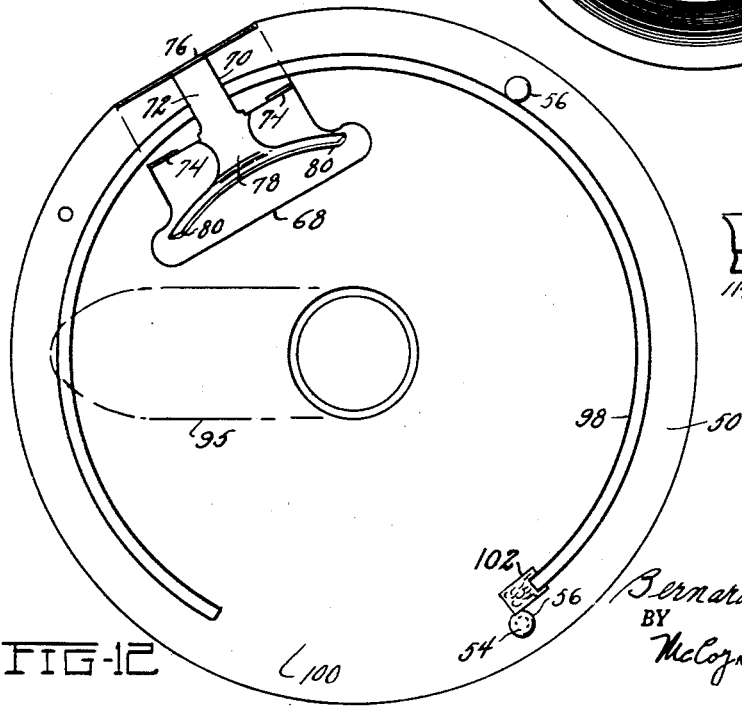
Figure 12 is a bottom plan view of the cover plate with a tape guide attached thereto.

Various refinements may be incorporated within the structures herein disclosed which add to the stability of the structure and promote the general smoothness of operation. For example, a horizontally elongated plate 95 may be attached to the top face of the cover plate 50 to extend radially from the roller bearing 46, 48 and may be equipped with parallel side grooves 97 which slidably receive the opposing edges 94 to provide an additional interlock between the horizontal arm 92 and the cover plate. Also, the flat underside of the plate 50 may have an integral cylindrical skirt 98 depending therefrom coaxial with the hub 40 to serve as a retaining wall for the coil 64. Any tendency of the coil 64 to unwrap would be defeated by the skirt 98 whereby the coil is positively retained on the deck 62. The flow of tape on to the coil 64 is then restricted to the gateway entrance 100 between the termini of the ring skirt 98 as best shown in Fig. 12.

In order to prevent a possible scrape or scratch and to insure a smooth flow through the entrance 100, either or both of the termini of the ring 98 near said entrance may be provided with a small flexible and resilient pad 102 of felt or other suitable material securely mounted in an inclined slot 104 cut into the terminus of the skirt 98. The pad 102 also prevents any undue curling of the tape and guards the same against any contact with other parts of the device, such as regulator screws 54.

The reel may be merchandised as a separate unit containing a predetermined message upon the tape and may be fitted to various makes of reproducers. These reproducers may be placed within merchandise displays, such as washing machines, animated figures, and the like, and will continuously repeat the message carried by the tape so long as the reproducer is operated. Programs may be prepared under studio conditions and delivered without accessories to fit individual types of reproducers. In order to reduce the cost of installing individual messages or programs, a recording may be imposed upon a length of tape 20, and this tape wound upon a separate annular element 110, which element includes a flat horizontal deck 62 extending radially from a fractional frusto-conical hub 112. The opposite side of the deck 110 is recessed to provide a seat 114. When these economical reels are employed the hub 40 may also be a fractional hub and provided with a partial annular extension 116 serving as a ledge upon which the annular element 110 may be seated.

In this assembly the device is then a full operating structure but does away with the necessity of each recording mount including all the additional structure herein shown, such as screws, cover plate and its positioning arm. By this arrangement it is only necessary to have a single complete device, and programs, therefore, may be supplied upon the partial hub element 110 which, when fitted into the structure, provide a complete operating unit. This is a materially economical factor in the commercial or pre-reproduced programs. This form of distribution may readily compete with the phonograph record distribution with the message or entertainment recorded on tape, which has the advantage of including extremely long time reproduction.

The parts 30, 40, 50, 58, and 110, for example, may be plastic elements with the remainder of the parts inexpensive sheet metal stampings or standard items readily available upon the market, so that there is an economical mechanism capable of carrying a long length of tape, and which not only fully protects the tape when not in use, but also holds the tape upon the reel in such a manner that it is easily fed therefrom without any undue tension or twisting.

Figures 15 to 29 show modified forms of the present invention which are less complicated than the forms shown in Figs. 1 to 14 but operate on the same basic principles. In each of the modified forms the coil of tape is supported for rotation about a vertical axis by a generally horizontal plate, means is provided for holding the inner cylindrical convolutions of the coil in frictional engagement and in positions substantially coaxial with the plate, means are provided for guiding the tape from the innermost cylindrical convolution and to the outermost cylindrical convolution of the tape coil, and means are provided for applying tension to the tape as it leaves said innermost convolutions so that the latter convolution has an angular velocity slightly greater than that of the plate.

Figures 15 to 18 show a generally cylindrical tape reel 120 which is adapted to be mounted in horizontal position for rotation about a vertical axis on a stationary rigid vertical stud or stub shaft 121. The stud 121 may be non-circular, unsymmetrical, or of any desired shape but is shown herein as being circular in horizontal cross section and having a free upper end portion 122 of reduced diameter and an enlarged lower portion 123 concentric to said upper portion.

The basic elements of the reel 120 are a smooth generally horizontal annular plate or disc 124, an annular upwardly projecting hub 125 rigidly connected to said plate, and an annular bearing member 126 rotatably supporting the hub and the plate carried thereby concentric to said bearing member. The bearing member is adapted to slide downwardly over the stud 121 and preferably has a tight fit with the end portion 122 so that the axis of the bearing member, the hub, and the coil-supporting plate is retained in a vertical position.

The bearing member 126 has an internal frusto-conical surface which engages the frusto-conical surface of the shoulder connecting the portions 122 and 123 of the stud 121 to limit downward movement of the bearing member. The lower end of the bearing member is enlarged to form an annular externally cylindrical flange 127. The flange provides a shoulder for supporting the hub 125 and has an external diameter greater than the minimum internal diameter of the hub. The member 126 is reduced in diameter towards its upper end so that it may slide out from inside the hub when the reel is disassembled.

The interior of the hub 125 has a shape corresponding to that of the exterior of the member 126 and is provided with smooth cylindrical bearing surfaces having a diameter only slightly greater than the smooth external cylindrical bearing surfaces of the bearing member with which they engage so that there is a minimum amount of friction when the disk 124 and the hub 125 rotate about their vertical axes. When the disk and the hub are made of plastic, the member 126 provides an excellent bearing when made of nylon or similar material.

An endless strip 128 of magnetic-coated plastic tape of uniform width and thickness may be spirally wound on the hub 125 with its lower edge in engagement with the flat horizontal deck provided by the plate 124 so as to form a flat roll or coil 129. The hub is axially tapered and increases in diameter away from the plate 124 so as to form a smooth-frusto-conical surface 130 for guiding the tape from the innermost cylindrical convolution of the coil. The innermost convolution is concentric to and engages the hub substantially throughout its circumference, but the area of contact between the hub and said convolution is very small due to the shape of the tub.

Since the cylindrical convolutions of the coil frictionally engage the deck formed by the plate 124 and frictionally engage each other, the coil and the plate supporting the same may be rotated merely by pulling on the tape. Since the hub means holds the inner convolutions of the coil in engagement, the reel will rotate whenever the feed rollers are driven, due to the friction of the moving tape. With the frusto-conical hub excellent results may be obtained where the reel is driven solely by the feed rollers that apply tension to the tape, the reel rotating at an angular velocity slightly less than that of the innermost coil convolution.

The tape-engaging portion of the deck formed by the plate 124 preferably has a smooth or polished surface with a thin coating of colloidal graphite to render the surface electrically conducting. If desired, a thin annular sheet 131 of a suitable material may be mounted on the plate 124 to provide the tape-engaging surface. The sheet 131 may be highly polished metal coated with graphite or even felt. However, it is usually preferable to omit the separate sheet 131 and to provide a smooth or polished uninterrupted upper surface on the plate 124 which may be coated with colloidal graphite.

Any suitable means may be employed to guide the tape 128 from the reel in the proper path of travel so as to prevent damage to the tape. It is often preferable to provide a stationary cover having tape guiding means incorporated therein and having downwardly projecting flanges surrounding the tape coil. As herein shown, the reel 120 is provided with an annular top cover 132 coaxial with the bearing member 126 including a flat central horizontal portion 133 and a marginal portion 134. The latter portion projects downwardly to form a cylindrically shaped flange or skirt 135 similar to the skirt 98 described above and having a bottom edge parallel to and closely overlying the flat upper surface of the plate 126 along the margin thereof.

The bearing member 126 has an upper end portion 136 of reduced diameter which projects through a central opening in the cover 132. The reel may be readily assembled or disassembled by sliding the bearing member 126 axially into or out of the hub 125 and the cover 132. The portion 136 has a press fit with the cover 132 so that the reel is held by friction in assembled relation and the member 126 engages the bottom of the cover rigidly to support the same in a stationary horizontal position out of contact with the plate 124. An annular recess 137 is provided between the top cover 132 and the plate 124 which is of a size to receive the tape 128 in a coil having a diameter less than the internal diameter of the skirt 132. The tape is preferably out of contact with the skirt and the outer wrap of the tape coil may be spaced a substantial distance from the skirt where the tape is relatively short. A pair of symmetrical openings 138 are provided in the marginal portion 134 of the top cover to admit the tape to the outermost wrap of the coil from outside the reel.

Suitable means may be provided on the stationary top cover for guiding the tape from the innermost convolution of the coil. As herein shown, the upper part of the marginal portion 132 of the top cover is provided with two symmetrical trapezoidal notches 139 leading to the opposite ends of a symmetrical V-shaped slot 140 in the horizontal portion 133 of said cover. The cover is split between the notches 139 to form a narrow unobstructed opening 141 extending from the slot 140 to the bottom of the skirt 135 to permit insertion of the endless tape 128 into the slot 140 without cutting the tape. As herein shown, the opening 141 is located substantially in a radial plane and the top cover is symmetrical with respect to that plane. As will be apparent from the drawings, the openings 138 and the slot 140 are adapted to receive the tape whether the coil is wound clockwise or counterclockwise. Each notch 139 increases in depth away from the opening 141 and has a width substantially equal to that of the tape 128. The portions of the top cover 132 adjacent each notch 139 and adjacent each half of the slot 140 have smoothly curved upper surfaces adapted to engage the tape and to guide the same from the innermost wrap of the coil 129.

The reel 120 may be employed in a sound recording or reproducing device substantially as shown schematically in Fig. 19. Such a device includes a flat horizontal table 142, a pair of upright tape guides 143 which are preferably circular in horizontal cross section, and a magnetic transducer head or pick-up head 144 which projects a short distance above the top of the table. The reel is supported on the table in a horizontal position for rotation about a vertical axis and the cover is held in a predetermined stationary angular position with respect to the guides 143. If desired, any suitable means may be provided to prevent rotation of the bearing member 126 or the top cover 132 out of such angular position so that the tape will be guided properly by the notch 139 and the slot 140 from the innermost convolution of the coil 129 to the guide 143. The guides 143 serve as rough positioning means for lowering the tape and for holding the side faces of the tape in upright position with the lower edge of the tape substantially in a horizontal plane as the tape passes from one of said guides, said horizontal plane being near the plane of the coil-carrying desk formed by the plate 124.

The tape recording device is provided with tape feeding means including an accurately machined, cylindrical, driving roll or capstan 145 and a spring-pressed, rubber covered, idler roll 146 which holds the tape against the capstan. The feed roll 145 rotates about a vertical axis which is preferably fixed and is driven at constant speed by an electric motor or other suitable driving means.

A pair of accurately machine vertical guide posts 147 of circular cross section are provided for holding the tape against the head 144 and accurately positioning the tape so as to obtain high fidelity reproduction or recording. The tape engaging surface of the head is smoothly curved and substantially in the form of an arc of a right circular cylinder so as to reduce friction between the tape and the head.

The guides 147 are preferably provided with annular grooves having a height substantially equal to that of the tape so as to locate the tape accurately in the vertical direction. The guides 147 and the idler 146 may be moved horizontally away from the head 144 and the drive roll 145 to discontinue feeding of the tape or to permit removal of the tape as described in more detail in my copending application, Serial No. 461,747, filed October 12, 1954, now abandoned, and in my copending application, Serial No. 500,633, filed April 11, 1955.

Where the endless tape in the reel 120 has a length of from about 100 to 400 feet or so, excellent results may be obtained by driving the feed roller at a constant speed to pull the tape from the innermost convolution of the coil by relying merely on friction between the coil and the reel to rotate the reel. With the longer lengths of tape, the horizontal tape-engaging surfaces of the coil and both the vertical side faces of the tape should be coated with colloidal graphite deposited from liquid.

It is sometimes desirable, particularly with magnetic tapes about 600 to 1200 feet long, to provide separate driving means for rotating the plate 124 so as to drive most of the convolutions of the tape coil through friction between said convolutions and the plate and to prevent undue variation in the torque required by the feed roll driving motor to maintain a uniform tape feed.

Such a separate driving means may be similar to the slip friction driving means for the hub 40 but preferably is of a type which does not require delicate or frequent adjustments. As herein shown, the annular plate 124 is driven by means of a motor driven cylindrical driving roll 148 which is moved into engagement with the cylindrical circumferential surface of said plate whenever the tape is to be pulled by the feed rollers 145 and 146. The roll 148 is driven at a constant speed and is synchronized with the feed roll 145 so that a small and substantially uniform tension is maintained on the tape as it leaves the innermost convolution of the coil 129.

In order to minimize friction between the convolutions of the tape coil as the tape moves from the outermost convolution to the innermost convolution, the speed of the feed roll 145 with respect to the coil 148 is preselected so that at least one convolution has an angular velocity greater than that of the plate 124 and the hub 125. Preferably less than about half of the tape in the coil has an angular velocity greater than that of the plate 124. Best results are usually obtained where the peripheral speed of the plate is maintained substantially constant by the roller 148 and the feed roll 145 has a peripheral speed from about 1 to 10 percent greater than the average peripheral speed of the portion of the plate below the innermost convolution of the tape coil whereby the angular speed of the innermost convolution is from about 1 to 10 percent greater than that of the plate 124. If desired the roll 148 may be driven by a slip clutch or an overrunning clutch so that the roll does not act as a brake to limit the speed of rotation of the plate 124.

The reel 120 may have the same size and shape as shown in Figs. 15 to 19 which are drawn substantially to scale. Where the plate 124 has a diameter of about 3 to 3½ inches, the coil 129 usually consists of about 50 to 150 feet of endless imperforate magnetic-coated tape with a uniform width of about one-quarter of an inch, about five to ten inches of tape normally being required to form the loop from the innermost to the outermost coil convolution. In such a case the innermost convolution usually has a diameter in the neighborhood of about one and one-half inches and the outermost convolution usually has a diameter no greater than about three inches.

If desired, the reel 120 may be designed in various sizes to be driven solely by the feed rollers 145 and 146 (omitting the driving roller 148) while carrying a spirally wound flat coil 129 that contains 100 to 400 feet or more of one-quarter inch magnetic tape with a uniform thickness somewhere in the neighborhood of about one to three thousandths of an inch. Such a coil would normally have an internal diameter of at least about 1½ inches, an external diameter less than five inches, and a radial thickness of about one-half to 1½ inches.

Satisfactory results may be obtained with tape lengths greater than six hundred feet without the driving roller 148 where high quality tapes are employed which are coated on both sides with colloidal graphite deposited from liquid and where the tape-engaging surfaces of the reel are similarly coated. However, it is difficult to design a reel which can operate for long periods of time continuously with extremely long tapes, particularly where the length of the tape is more than about one thousand feet.

The various reels illustrated in Figs. 1 to 18 operate on the same basic principles and may efficiently handle an endless tape having either an ordinary or a Mobius loop. As herein shown, the tapes have an ordinary loop and only one side of the tape engages the magnetic pick-up head. The playing time of a given length of endless tape may be doubled by cutting the tape, making a half twist in one strand, and splicing the tape to form a Mobius loop connecting the innermost and outermost convolutions of the tape coil as shown, for example, in Fig. 21 of said copending application Serial No. 500,633. With such a Mobius loop, both the upper and the lower portions of the tape successively engage the electrically effective portion of the magnetic pick-up head as the tape moves through the coil twice; and, using a half-track head, a long message may be recorded on a tape of relatively short length.

It will be understood that the reels disclosed in the above-mentioned application Serial No. 324,449 and shown in Figs. 1 to 14 of this application function similarly to the simplified reels of Figs. 15 to 29. Thus, the coil-carrying deck 62 of the former reels may be driven so that its angular speed is slightly less than that of the innermost convolution of the coil by properly adjusting the screws 52 to control the slippage in the clutch. The angular speed of the deck 62 may be adjusted so that it is less than the angular speed of half of the convolutions of the tape coil and is preferably adjusted so as to be from about 1 to 10 percent less than the angular speed of the innermost convolution.

The slip-friction driving means for the deck 62 including the clutch disk and the felt clutch plate may be omitted, particularly where the coil of tape is relatively small, in which case the deck would be rotated solely by applying a tension to the tape to pull it from the innermost convolution. Whether or not the deck 62 is positively driven, the feeding means 16 maintains a tension on the tape leaving the innermost convolution of the coil.

While the driving roll 148 of the tape recording mechanism illustrated in Fig. 19 is shown driving the coil-carrying plate of the reel 120, it will be understood that a reel of the type shown in Figs. 1 to 14 or any of the other reels disclosed herein may be employed with such a tape recording mechanism. If the externally cylindrical plate 58 forming the deck 62 of the first-described reel engages the roll 148 so as to be driven thereby, the clutch disk 30 and the felt pad 36 may be omitted or rendered ineffective.

As shown herein, the upper and lower edges of the endless tape are of the same length and are spaced apart the same distance throughout the length of the tape so that the tape may be wound with its side faces vertical to form a flat coil having cylindrical convolutions.

In order to further reduce friction between the convolutions of the tape coil and to prevent the build-up of electrostatic charges which cause binding of the tape, it is preferable to provide means for lubricating the tape and for rendering the tape electrically conductive substantially throughout its length, for example, as disclosed in my U. S. Patent No. 2,804,401.

According to the present invention, both single-coated and double-coated magnetic sound tapes to be employed in the apparatus illustrated in the drawings are provided on at least one side thereof with a thin substantially uniform coating of graphite deposited from liquid, which coating is continuous throughout the length of the tape so that a substantial electrostatic charge may not be built up in the coil convolutions. Such an electrically conductive coating must be continuous to carry effectively static charges along the length of the tape and must be uniform and relatively smooth to permit sliding between adjacent convolutions of the tape coil.

To have the desired uniformity of draw or drag, the electrically conductive coating must not only be continuous and uniform but must also have the lubricity of graphite, for it has been found that magnetic tape which has been vacuum-coated with a non-magnetic conductive metal, such as aluminum, magnesium, zinc or the like to form a thin uniform and continuous film on the tape does not provide the desired uniformity of drag or the long life of the tape used herein. Also when, as hereinafter pointed out, graphite dust is merely rubbed on a tape, a uniformity is not obtained which is comparable to that obtained where the coating is deposited from liquid.

It is preferable to employ a method of coating the tape wherein a uniform and continuous shingle-like film is deposited on the non-conductive surface of a magnetic tape from a substantially uniform dispersion in liquid of a plate-like, electrically conductive material, such as graphite. Aluminum flake or the like, when deposited from solution, also provides some of the desirable results sought but is inferior to graphite. The dispersed material is preferably non-magnetic and of substantially colloidal size.

Since a graphite coating serves as a lubricant as well as an electrical conductor and is readily bonded or adhered to the magnetic coated or uncoated side of the tape, it is usually preferable to coat the tape using a method substantially as disclosed in the aforesaid U. S. Patent No. 2,804,401. According to this method, minutely divided graphite particles suspended in a liquid carrier are applied by brushing, spraying, or other suitable manner to either side or both sides of a magnetic sound tape and such particles adhere to the tape as the liquid is evaporated. The graphite is preferably in the form of minute plate-like particles of flakes of colloidal size, and the liquid carrier preferably includes a substantial amount of a liquified gas or a highly volatile liquid, such as Freon, Fluron, isopropyl alcohol, carbon tetrachloride or the like, so that it will evaporate readily. The volatile liquid may be gasoline, but is preferably of a type which is not readily inflammable, such as a highly halogenated hydrocarbon or the like.

According to the present invention both the tape and the tape-supporting surfaces of the reel are coated with graphite particles of colloidal size deposited from liquid. It will be understood that the term "colloidal" as used herein designates micronically fine particles which are so small that, under normal conditions, they can remain dispersed and suspended in a liquid, such as water, gasoline, or the like, for extended periods of time without settling out. Such particles normally have a particle size not substantially in excess of about 10 microns. Those particles having a diameter over 20 microns (.020 millimeter) are clearly non-colloidal and will rapidly settle out of a solution.

Non-colloidal graphite particles do not provide a satisfactory coating for magnetic tapes and a good coating usually cannot be obtained using graphite with an average particle size in excess of about ten microns. In general the results improve as the size of the particles applied to the tape decreases. According to the present invention preferably at least about ninety percent of the particles applied to the tape have a particle size not in excess of about ten microns and the average particle size is preferably not in excess of about five microns. Results improve as the percentage of large particles decrease since the large particles do not adhere strongly to the tape, and good results can usually be obtained if none of the particles of graphite have a diameter over about ten microns. Better results are obtained when all the graphite has a particle size less than five microns, but it is sometimes desirable to use less expensive graphite which contains small amounts (say up to five or ten percent) of graphite with a larger particle size. Superior results can be obtained where the graphite applied to the tape has an average particle size not in excess of about two microns and at least about ninty percent of the particles have a particle size not in excess of about five microns, and best results can be obtained if all of the particles have a maximum diameter not in excess of about five microns.

Graphite particles can be screened to obtain the proper particle size. An almost ideal graphite film may be applied to the tape by spraying the tape with a solution containing graphite particles with an average particle size less than two microns. After a suitable screening, it is possible to obtain extremely fine graphite wherein about 90 to 95 percent has a particle size not in excess of 1½ microns and the remainder has a particle size not in excess of about three microns. Extremely fine graphite of this type when deposited on a tape from solution adheres very strongly to the tape and provides an ideal coating for the tape whether deposited on a magnetic-coated or uncoated face of the tape.

Synthetic graphite and natural graphite both have a plate-like structure and provide a shingle-like film when deposited from liquid. However, the synthetic graphite is easier to obtain in colloidal size. Although natural graphite cannot readily be ground to a colloidal size suitable for application to tape using ordinary commercial milling procedure, it provides the highest quality coating for the tape when it is milled or otherwise broken down to the size required by the present invention.

It will be understood that the term, "particle size" as used herein referes to the maximum dimension or largest diameter of the particle.

I have found that, when the tape is provided with a coating deposited from liquid of graphite which has a fine enough particle size so as to be suspended in liquid, the tape has surprisingly superior performance characteristics. Although the reason therefor is somewhat uncertain, the fineness of the particle size of the graphite is extremely important. The graphite coating facilitates opertaion of the tape at a uniform rate of speed and for a maximum period of time with a minimum of friction. The coating should be continuous throughout the length of the tape and should be fairly uniform so as to provide an effective conduit for the flow of electrons along the length of the tape. Although it might seem that flakes of a relatively large particle size would provide more overlapping, better lubrication, and better conductivity; the smaller particles on the tape are found to provide superior operating characteristics due to the more uniform and continuous coating and the ability of the smaller particles of graphite to adhere strongly to the tape without any binder.

Heretofore, attempts have also been made to lubricate tape for continuous operation by sprinkling graphite powder over the surface of the tape coil, but this method did not give the satisfactory performance of tape prepared in accordance with the present invention. Running of the tape through the mechanism ultimately wiped the greatest part of the graphite powder off the tape and the tape still failed in a comparatively short time. The method also had the disadvantage that large amounts of graphite collected in the mechanism. Also the coating on the tape was not uniform and was not continuous so as to provide an effective path for the flow of electrons. Apparently, the small particle size of suspended graphite is required to provide a cohesive force which is greater than the wiping force that can be applied to the particle.

As above mentioned, the preferred coating for a magnetic tape is an extremely thin film of graphite particles of colloidal size which is uniform and continuous and which has a very low resistance to the flow of electrons along the length of the tape. The film provides the most effective coating when the graphite particles are arranged in a shingle-like formation characteristic of a film deposited from a liquid in which the graphite is suspended but preferably in the substantial absence of a film-forming or resinous binder which could insulate or adhere the separate particles together or to the tape surface. The deposit of the particles of graphite or other material from a volatile liquid is advantageous since the resulting dried film is more uniform and more continuous, particularly where the particles are evenly dispersed in the liquid. Colloidal particles deposited from solution also tend to stick to the tape better than particles applied in the dry state and tend to form a shingle-like film most suitable for conducting electric charges along the tape, the surface tension during the drying period apparently tending to move any particles which are not substantially parallel to said surface into parallel positions whereby a most desirable shingle-like pattern is provided.

Deposit of colloidal graphite from liquid also has the advantage that anti-agglomerating agents may be used to prevent flocculation or bunching of particles as disclosed in my U. S. Patent No. 2,804,401.

The magnetic sound tape may consist of various flexible non-magnetic materials, such, for example, as cellulose nitrate, cellulose acetate, cellulose butyrate, polyvinyl chloride, or the like. The most important of these is cellulose acetate which is used extensively for the manufacture of magnetic tape ribbons. A tape of highest quality can be made of "Mylar" (polyethylene terephthalate oriented by stretching in two substantially perpendicular directions and having a molecular weight sufficiently high to show a characteristic crystal X-ray diffraction pattern when stretched).

Since graphite particles of colloidal size deposited on a tape from solution according to the method of the present invention strongly adhere to the tape and have not sufficient size to readily rub off the tape, it is unnecessary and generally undesirable to use a binder to attach the graphite particles to the tape.

According to the method of the present invention, the horizontal tape-supporting surfaces of the tape reel from the hub to the peripheral edges of the reel are coated with colloidal graphite in the same manner as described above with regard to the tape, the liquid carrier containing the colloidal graphite being applied by brushing, spraying or other suitable manner to the reel surface. When the volatile liquid carrier (Freon, isopropyl alcohol, or the like) is evaporated, there remains a thin, uniform and continuous electrically-conductive graphite film which adheres strongly to the tape-supporting surface of the reel and completely covers said surface to the outer margin thereof. Such a film has the shingle-like formation typical of flaked material deposited from liquid and effectively conducts static electricity so as to prevent the buildup of static charges between convolutions of the tape coil. The colloidal graphite particles used for coating the reel are preferably of the same size and shape as employed in coating the faces of the tape and will adhere to smooth metal or plastic surfaces of the reel without a binder.

For convenience in illustrating, one form of tape reel according to the present invention is shown in Figs. 20 to 23 mounted in a modified form of magazine A³ as shown in Figs. 28 to 31 of said copending application, Serial No. 500,633; however, it will be understood that such tape reel may be designed to fit a standard tape recorder or other magazines of the type disclosed in said copending application. The magazine A³ is shaped substantially like the magazine A and A² of said copending application Serial No. 500,633 and has a substantially rectangular front portion 285 and a rounded rear portion 286 in which may be mounted an endless tape reel (for example, a reel similar to the reels 20 and 20a of said copending application or similar to the reel 120 or any of the other reels disclosed herein).

The magazine has a flat bottom wall 287 extending the full length of the magazine and an annular vertical stud 32b integral with said bottom wall and extending upwardly therefrom. Mounted on the stud 32b above the bottom wall 287 is a one-piece cover 288 having a flat top wall 50b and an integral continuous marginal wall 289 that extends along and engages the margins of the bottom wall. The marginal wall includes a semi-cylindrical vertical rear wall portion 35b concentric to the vertical stud 32b, parallel longitudinal vertical side wall portions 36b and 37b, and a transverse vertical front wall portion 40b perpendicular to said side wall portions.

The lower forward portion of the magazine is provided with a substantially rectangular recess 38b with a vertical marginal wall 39b integral with the bottom wall 287 and forming the front marginal edge of said bottom wall. A flat horizontal plate 290 is molded integral with the wall 39b near the top end thereof and is located above the recess 38b. Said plate is parallel to the top wall 50b of the cover 288 and is spaced a short distance therefrom to provide a straight transverse slot 52b above the recess 38b and communicating therewith for receiving the tape 17b as shown in Fig. 29.

The cover 288 has an annular thickened portion 291 recessed to receive the upper portion of the stud 32b and is positioned in engagement with the wall 39b and the stud with its top plate 50b parallel to the bottom wall 287 and its marginal wall 289 in engagement with the marginal portions of said bottom wall. The stud 32b is internally threaded to receive an attaching screw 51b coaxial with the stud and the cover portion 291 which screw detachably connects the cover to the stud. Like the magazine A², the cover and the portions of the magazine A³ integral with the bottom wall may be economically molded of a suitable plastic material.

The marginal walls 39b and 289 provide a large chamber 30b in the rear portion 286 of the magazine for receiving an annular tape reel 20b with a flat roll or coil 29b of endless magnetic tape 17b mounted thereon for rotation about a vertical axis. The parallel portions of the vertical walls 36b, 37b and 39b define rectangular tape-receiving channels 292 and 293 at the front corner portions of the magazine, and a loop of tape extends forwardly from the innermost cylindrical convolution of the coil 29b through the channel 293 to one front corner portion of the magazine, laterally across the recess 38b to the other front corner portion of the magazine, and rearwardly through the channel 292 to the outermost cylindrical convolution of the coil.

As herein shown, the portion of the tape moving rearwardly in the channel 292 toward the coil 29b is untwisted and has vertical side faces, but it will be understood that the tape will twist 180 degrees during movement from the front of the magazine to the outermost convolution of the coil 29b where a Mobius loop is employed. Like the walls 39 and 39a of the magazines A and A² of said copending application, Serial No. 500,633, the wall 39b is spaced from the front wall portion of the magazine to permit movement of the tape laterally between the front corner portions of the magazine, vertically elongated openings 284 being provided between the wall portions 39b and 40b to receive the tape and to permit vertical movement thereof into and out of the recess 38b.

The portion of the tape extending through the openings 284 between the front channels 292 and 293 is supported by a pair of independent, alined, vertically movable, tape guides 41b of similar shape and is adapted to be moved by the guides between a lowermost position wherein it is exposed in the recess 38b as shown in Figs. 22 and 23 and an uppermost position wherein it is in the slot 52b and completely enclosed by the magazine as shown in Figs. 20 and 21. The tape guides 41b are mounted for vertical swinging movements about a horizontal axis on a pair of laterally alined pivot pins or screws 294 which are received in laterally alined, internally threaded openings in the wall 39b near the front ends thereof. Each tape guide is biased towards its uppermost position shown in Fig. 21 by a coiled tension spring 42b, said spring having one end connected to the tape guide and its opposite end connected to the wall 39b so as yieldably to resist rotation of the guide from said uppermost to said lowermost position.

Each guide 41b is formed with a smooth guide slot 295 at its forward end for receiving and guiding the tape 17b, said slot having a width substantially equal to that of the tape so as to engage the opposite edges of the tape as it moves in the slots and having a smoothly curved surface for engaging the face of the tape along its full width. Said smoothly curved surface of the slot 295 is vertical when the tape guide is in its lowermost position as shown in Fig. 23 so as to hold the side faces of the tape vertical and is nearly horizontal when the tape guide is in its uppermost position as shown in Fig. 21 so as to support the tape horizontally in the transverse slot 52b above the recess 38b.

The front corners of the tape guides 41b nearest the side walls 36 and 37b are provided with smooth retaining lips 296 to prevent movement of the tape out of the slots 295 accidentally, the retaining lips of each slot extending from the top and bottom of the slot towards each other to provide the slot with a narrow mouth having a width preferably not substantially greater than about half the width of the tape as shown in Fig. 23.

The slots 295 are spaced from the pivots 294 a distance corresponding substantially to that between said pivots and the lower portion of the slot 52b so that a substantially straight portion of the tape 17b stretched between the guides 41b may be rotated about the pivots 294 from the recess 38b into the transverse slot 52b. The front edges of the tape guides 41b are closer to the pivots 294 than the top wall 50b and the front wall 40b so that the guides are free to rotate between their uppermost and lowermost positions as indicated above.

The tape guides 41b may be swung vertically about their pivots 294 in unison to lower the tape after the magazine A³ is moved to its operating position on a tape recording or playback device or at an earlier time. Said guides may lower the tape in response to rotation of a control knob or in response to movement of the magazine to said operating position. As herein shown, the guides 41b are actuated in unison by a pair of identical, laterally alined, vertical, cylindrical pins 203a. The bottom wall 287 is provided with a pair of laterally alined, circular openings 297 with a diameter substantially equal to that of said pins for slidably receiving the pins when the magazine is in its normal operating position, and the rear portions of the tape guides 41b are shaped to provide smoothly curved cam surfaces 298 for engaging the tops of the pins 203a to cause vertical swinging of the guides. When the cam surface 298 is positioned relative to the actuating pin 203a as shown in Fig. 23 the tape is fully depressed; and, when said surface is out of contact with the pin, the tape is out of the recess 38b and completely enclosed by the magazine as shown in Fig. 21. If desired, the pins 203a may be rigidly connected to the top plate 5b and fixedly held in the position shown in Fig. 23 so that the tape is lowered as the magazine A³ is dropped on said pins.

As herein shown, a recording and reproducing device 1c is provided having electrical apparatus including a constant speed electric motor, a loudspeaker, an amplifier and other conventional electronic equipment housed within a box or case 2b. The electrical apparatus may be regulated by switches and suitable control knobs to control sound, speed, tone, volume and/or the like and to energize and de-energize the electrical apparatus, for example as disclosed in said copending application, Serial No. 500,633.

The top portion of the case 2b is formed by a flat horizontal sheet metal plate 5b which has a smooth flat horizontal upper surface for supporting the tape magazine A³. A magnetic recording and playback transducer head 7b projects a short distance above the smooth top surface of the plate 5b and has a smoothly curved vertical tape-engaging surface above said top surface, said head being provided with suitable electrical apparatus for establishing magnetic flux interlinkage with successive portions of the imperforate magnetic-coated tape 17b supplied from the magazine or cartridge A³. The device 1c has a pair of horizontally movable grooved cylindrical guide pins 83b for holding the tape against the head 7b, a motor-driven capstan or feed roller 86b of small radius, and a freely-rotatable rubber-covered idler roller 87b of substantially larger radius that project vertically a short distance above the plate 5b for engagement with the tape from the magazine A³ when the tape is in its lowermost position as shown in Fig. 23. The elements 7b, 83b, 86b and 87b may be the same as the elements 7, 83, 86 and 87, respectively, of the tape recorder 1 described in said copending application, Serial No. 500,633 and may function in the same manner.

If long lengths of tape are to be employed, it is sometimes desirable to provide a reel-driving roller 105b, corresponding to the roller 105 of said tape recorder 1, for drivingly engaging the reel in the chamber 30b of the magazine A³, in which case a notch 53b may be provided in the bottom wall 287 of the magazine and the vertical wall 39b to permit inward movement of the roller 105b into and out of engagement with the tape-carrying reel, but such a driving roller is unnecessary and is preferably omitted for ordinary lengths of tape in which case the tape is driven solely by the feed rollers 86b and 87b.

In order to facilitate movement of the magazine to an operating position and threading of the tape between the feed rollers and adjacent the smoothly curved vertical surface of the magnetic transducer head, it is preferable to design the recording and reproducing device 1c and the magazine A³ so that the magazine may be moved substantially horizontally into and out of its operating position without the tape engaging the magnetic head 7b or the capstan 86b, for example, by providing means whereby there is relative movement between the tape and said magnetic head and/or said capstan to permit movement of the tape over said head and said capstan as the magazine is moved horizontally. The device 1c may be designed to move the capstan and the magnetic head downwardly out of the path of movement of the tape or the magazine may be designed to move the tape upwardly above the top of said capstan and said head, for example, in response to rotation of the main control knob to the "off" position, so that the tape will clear said capstan and said head as the magazine is moved horizontally. Where the capstan and the magnetic head (or heads) are on the outer side of the tape as in Fig. 25, the mechanism may be designed to swing the rubber idler roller and the metal guide pin (or pins) upwardly and downwardly relative to the tape or to move the tape upwardly and downwardly. Where the magnetic heads are on the outer side of the tape so as not to interfere with horizontal movement of the tape and the magazine, it will be apparent that the idler roller (see roller 87c of Fig. 25) may be the only member that could interfere with such horizontal movement if the metal guide pin (see pin 83c of Fig. 25) for the magnetic heads is rigidly carried by the magazine or is replaced by a spring finger or the like carried by the magazine to press the tape against the magnetic heads.

As herein shown, the tape 17b is moved upwardly and downwardly rather than the magnetic head 7b or the capstan 86b, the recess 38b of the magazine permitting movement of the magazine over said magnetic head and said capstan. The front lower portion of the magazine A³ is open forwardly of the rectangular recess that receives the magnetic head so as to permit movement of the feed rollers into a tape-feeding position in engagement with the opposite side faces of the tape, a rectangular opening 299 being provided in the front wall portion 40b for this purpose. Such opening may have a width just sufficient to permit movement of the idler roller 87b against the capstan 86b if the magazine is dropped vertically to its operating position but preferably has a length corresponding to that of the recess 38b and a height slightly greater than that of the magnetic head 7b and the capstan 86b so as not to interfere with horizontal movement of the magazine into or out of its operating position.

The tape guides 41b are tilted when the cam surfaces 298 thereof engage the pins 203a in response to relative vertical movement between said pins and the bottom wall 287 of the magazine. Such relative movement may be obtained by moving the pins 203a upwardly through the openings 297 from a position below the top surface of the plate 5b by means of a rotatable control knob or other movable control member after the magazine A³ is in its normal operating position shown in Figs. 22 and 23, or by mounting the pins 203a in a stationary position on the plate 5b and dropping the magazine A³ over the pins in which case the pins 203a would serve as locating pins to prevent horizontal movement of the magazine on the plate 5b out of its normal operating position and the magazine would have to be moved vertically to said operating position.

The magnetic pick-up head 7b and the capstan 86b do not interfere with vertical swinging of the straight portion of the tape stretched laterally between the slots 295 of the tape guides and are positioned so as to be adjacent the rear vertical face of the tape when the tape is in its lowermost position in the recess 38b. The curved surfaces of the slots 295 engaging the rear side face of the tape are vertical and substantially in lateral alinement with the front vertical surfaces of the capstan and the magnetic head when the tape is lowered as shown in Fig. 22 so that the tape may easily be lowered between the feed rollers 86b and 87b substantially to a playing position in engagement with the magnetic head. After the tape is lowered the feed rollers may be moved to a tape-feeding position in engagement with the opposite vertical faces of the tape and the tape may be pressed against the magnetic head for recording or reproducing.

Figures 20 to 24 show one form of endless tape reel 20b according to the present invention which functions effectively when operated upside down, said reel being shown for convenience in the magazine A³ although it obviously may be mounted in the magazine A or A² mentioned above or in various other magazines or may be mounted on a stud not associated with a magazine. The reel 20b is particularly advantageous for use on a sound tape recording and/or reproducing device for an airplane or other vehicle where the reel is sometimes tilted or turned upside down during operation.

Like the tape reels 20 and 20a mentioned above, the reel 20b has a round axially-tapered tape-engaging hub and a coil-supporting plate at the smaller diameter end of the hub that is rotatable with said hub so that the reel 20b functions like the previously described reels when it is in its normal operating position with its axis vertical. However, unlike the previously described reels, the reel 20b has a second plate at the larger diameter end of the hub that is rotatable with said hub and that supports the coil when it is inverted. When the reel is operated in an inverted position with its axis vertical, it functions much like the reels 20, 20a and 120 except that the tape from the innermost cylindrical convolution of the coil is withdrawn at the larger diameter end of the tapered hub and passes under the coil as it moves to the front corner portion of the magazine. In such a case there may be substantial friction between the tape leaving the innermost convolution and the bottom of the tape coil.

In order to reduce friction it is preferable to employ a magnetic-coated tape ribbon on the reel 20b that has both faces coated with a thin continuous film of colloidal graphite, for example, by the method disclosed in my copending application, Serial No. 500,403, filed April 11, 1955.

The tape produced by such method is coated throughout its width and length with iron oxide or other suitable magnetic material and the magnetic coating is covered throughout its width and length with a thin uniform and continuous film of colloidal graphite particles which adhere strongly to the tape, said film having the shingle-like formation characteristic of flaked material deposited from dispersion in liquid. Both side faces of the tape may have such a shingle-like graphite film and both faces may have a magnetic oxide coating beneath the graphite film. The tape may, for example, have a flexible imperforate base or ribbon of cellulose acetate, "Mylar," or other suitable plastic non-magnetic material that is of uniform width and thickness, that is coated on both sides with finely divided particles of iron oxide in a suitable binder, and that has a thin uniform and continuous film of colloidal graphite completely covering each of the magnetic coatings as disclosed in said copending application Serial No. 500,403. Each of the graphite films reduces the coefficient of friction of the tape 17b and renders such tape electrically conducitve along its length so as to prevent the buildup of static charges between convolutions of the tape which could cause attraction between the adjacent convolutions and binding of the tape. Best results are obtained when both faces of the tape are coated with graphite.

A nylon bearing member similar to the bearing members 23 and 23a of the reels 20 and 20a, respectively, may be mounted on the stud 32b to provide a superior anti-friction support for the reel 20b, or a ball bearing may be mounted between the stud and the reel for this purpose. However, as herein shown, the stud 32b has a smooth outer bearing surface that engages the reel 20b to mount the same concentric to the stud for rotation about an aixs perpendicular to the bottom wall 287.

The reel 20b is shown herein with a molded plastic frusto-conical hub 300 that increases in diameter toward the top wall 50b and a flat molded plastic circular disc or plate 301 rigidly connected to said hub and having a cylindrical upwardly projecting inner portion 302 coaxial with said hub. The plate 301 has a smooth flat tape-engaging surface 303 which is located in a plane perpendicular to the axis of the hub 300, and the portion 302 has a smooth internally cylindrical bearing surface which engages the bearing surface of the stud 32b to position the surface 303 parallel to the bottom wall 287. The axial length of the inner cylindrical portion 302 may be slightly less than the distance between the flat reel-supporting surface of the stud 32b and the flat bottom surface of the plastic cover portion 291 to provide a small clearance between the stationary portions of the magazine and the rotating reel while preventing substantial axial movement of the reel in either direction. The cylindrical bearing surface of the stud 32b engaging the inner cylindrical surface of the disc 301 has an axial length greater than said clearance so that the reel is held against tilting in a position coaxial with the stud 32b even when the reel is upside down. When the reel is inverted the flat end surface of the cover portion 291 engages the axially outer end of the portion 302 and provides an anti-friction bearing surface on which the reel may rotate.

Rigidly connected to the upper or large diameter end of the hub 300 is a flat annular molded plastic plate or disc 304 shown herein as being of circular shape and having the same diameter as the first-mentioned plate 301. The second plate 304 has a smooth flat tape-engaging surface 305 located in a plane parallel to the surface 303 of the first plate 301 and spaced from said surface by a distance greater than the width of the tape 17b and the axial height of the coil 29b supported on the reel between said surfaces. The hub 300 has a smooth exterior frusto-conical surface 306 which engages the innermost cylindrical convolution of the coil 29b and extends substantially from the surface 303 to the surface 305. The distance between the flat tape-engaging surfaces 303 and 305 of the reel 20b is substantially less than twice the width of the tape to prevent tangling of the tape and should be sufficient to permit easy movement of the tape between the coil 29b and the disc surface 305. Said distance may be greater than the width of the tape or the axial height of the coil by a very small amount (for example, about five to ten times the thickness of the tape) depending on the width and thickness of the tape employed and usually by an amount not substantially greater than about one-tenth of an inch so that the coil does not move axially a substantial distance on the reel when the reel is inverted.

The top plate 304 may be glued or otherwise rigidly attached to the reel after the coil 29b is mounted on the hub 300. If desired, an opening may be provided in the plate 304 or a detachable connection may be provided between the hub and the plate to permit access to the coil but such access is usually unnecessary after the coil 29b is once mounted properly on the hub.

As herein shown, the tape from the innermost cylindrical convolutions of the coil 29b passes between the top of the coil and the surface 305 to the tape guide 41b at the front of the magazine without engaging any auxiliary stationary guides, but it will be apparent that a stationary guide similar to the guide 274 of said application, Serial No. 500,633, or any other suitable guide may be provided if desired.

The upper and lower edges of the endless tape 17b are shown herein as being of the same length and are spaced apart the same distance throughout the length of the tape so that the major portion of the tape may be wound with its side faces vertical to form a flat coil 29b having contacting cylindrical convolutions. Special tapes which form frusto-conical coil convolutions may also be mounted on the reel 20b, but they are more expensive to manufacture, are harder to handle, and require special tape magazines to accommodate the tape loop. Ordinary tape such as the tape 17b is preferred and permits movement of the tape in a horizontal plane from the magnetic head to the outermost convolution of the coil.

The hub of the reel 20b is frusto-conical as shown herein, but it will be understood that various other hub means may also be employed which hold the coil 29b concentric with the discs 301 and 304 and permit rotation of the reel by frictional engagement with the tape. The hub means should hold the inner convolutions of the endless tape coil in frictional engagement and in position coaxial with the reel and should cause sufficient friction between the coil and the reel to rotate the reel at an angular velocity at least substantially equal to that of the outermost coil convolution whether the reel is upright or turned upside down.

The rotating capstan or driving roll 86b and the spring-pressed idler roll 87b may be moved into engagement with the tape 17b to apply a tension to the tape to pull it from the reel 20b The capstan 86b rotates about a fixed vertical axis and is driven at a predetermined constant speed by an electric motor or other suitable driving means.

The tension applied to the tape by the feed rolls pulls the tape from the innermost convolution of the coil across the face of the magnetic head 7b at a substantially constant speed. Where the endless tape does not have excessive width or length, the feed roller 105b is preferably omitted, and excellent results may be obtained relying on the friction between the tape and the reel to rotate the coil-supporting plate of the reel. With a small coil of tape on the reel 20b (for example, a one-quarter inch wide tape having a length less than 200 feet or so) there is little variation in the tension on the tape due to friction between the convolutions and the tape feed will be uniform with a minimum amount of "wow" or distortion.

With ordinary size tapes the reel 20b operates efficiently in upright position or upside down position without any drive roller 105b. The feed rollers pull the tape at a predetermined constant linear speed preferably between about 1⅞ inches and 15 inches per second so that the innermost convolutions of the tape have an angular velocity greater than that of the hub 300 and the plates 301 and 304, the sliding friction between said hub and the tape and between the coil and one of said plates causing rotation of the reel at an angular velocity greater than that of the outermost coil convolution. When the reel is upright as shown in Fig. 21, the friction between the tape convolutions and the reel rotates the reel, and the rotating surface 303 engages the bottom edges of the coil convolutions to reduce friction between said convolutions.

When the reel is upside down, the friction rotates the reel in a similar manner and the rotating surface 305 engages the edges of the coil convolutions to reduce the friction between the convolutions, but the weight of the coil presses down on the tape passing from the innermost convolution between the coil and the surface 305. The friction produced by contact of the coil 29b and the surface 305 with the tape leaving the coil may reduce the efficiency of the reel somewhat when the reel is operated upside down but does not prevent the use of substantial tape lengths in the reel even when so operated.

Where larger tape reels are used it is sometimes desirable to provide separate driving means for rotating the reel so as to minimize the friction between convolutions of the coil and to prevent variation in the torque required by the feed roll driving motor to maintain a uniform tape speed past the magnetic head 7b. Where the length of the endless tape 17b is more than 300 feet and particularly where said length is about 600 feet or more, the reel driving roller 105b may be employed to reduce the friction between the contacting cylindrical convolutions of the coil 29b. The reel-driving roller 105b is synchronized with or operably connected to the driving roller 86b so that a small and substantially uniform tension is maintained on the tape as it leaves the innermost convolution of the coil 29b. Said reel-driving roller may be moved into engagement with the circumferential edge of the disc 301 as shown in dot-dash lines in Figs. 20 and 21 when the idler roller 87b is moved against the capstan 86b.

In order to minimize friction between convolutions of the tape coil as the tape moves in the coil from the outermost cylindrical convolution to the innermost cylindrical convolution, the speed of the capstan 86b with respect at the reel-driving roller 105b is preselected so that at least one and preferably several convolutions of the tape coil have an angular velocity slightly greater than that of the rigidly connected plates 301 and 304. Preferably less than half of the coil convolutions have an angular velocity greater than that of said plates. Best results are usually obtained where the peripheral speed of the plate 301 is maintained constant by engagement with the roller 105b and the capstan 86b has a peripheral speed from about 1 to 10 percent greater than the average peripheral speed of the portion of the plate below the innermost convolution of the tape coil so that the angular speed of said innermost convolution is from about 1 to 10 percent greater than that of the plates 301 and 304.

With the longer tapes, by controlling the angular speed of the reel 20b so that there is no more than about ten percent or so differential speed, the "wows" are substantially eliminated. Coating of the tape and the reel uniformly with colloidal graphite also reduces the "wow" and distortion due to variation in the linear speed of the tape at the magnetic head.

A tape handling mechanism may have the same relative sizes and shapes as shown in Figs. 20 to 24 which are drawn substantially to scale. As will be apparent from the drawings, a one-quarter inch imperforate magnetic-coated tape employed in the magazine $A^3$ may have a loop with a length of only about five to ten inches extending from the innermost to the outermost coil convolution and the major portion of the tape in said loop may be located between the horizontal planes containing the top and bottom surfaces of the coil. It will also be apparent that the reel 20b may be designed to operate with substantially the same sizes and lengths of tape as with the reel 120, at least where said reel is operated in its normal upright position.

If desired, the top plate 5b, the reel 20b and many parts of the magazine $A^3$ may be constructed of a suitable metal. However, as herein shown, the magazine $A^3$ is constructed entirely of plastic except for the springs 42b and the screws 51b and 294, and the reel 20b is made entirely of plastic. Such plastic may be polystyrene, high-tensile-strength polyethylene, rigid polyvinyl chloride, nylon and various other materials.

Where the plates or discs 301 and 304 are made of metal, the surfaces 303 and 305 are preferably highly polished from the hub to the marginal edges of the plates. Where such plates are molded of plastic, however, an extremely smooth and shiny surface may be obtained during the molding operation without polishing. According to the method of the present invention, the surfaces 303 and 305 from the hub 300 to the marginal edges of the plates 301 and 304 are coated with a thin, uniform and continuous film of colloidal graphite as indicated in Fig. 20 to lubricate the tape and to prevent the build-up of static charges between convolutions. Such a film may be applied to a polished metal surface, as well as a plastic surface and will adhere to the surface without a binder. The volatile liquid carrier that is sprayed on the surface, however, is preferably of a type which does not react with or dissolve the material forming the surface.

The tape-supporting surfaces of the plate 124 and the entire tape-supporting surface 62 of the plate 58 from the frusto-conical surface of each reel hub to the circular marginal edge of each plate are coated with the same type colloidal graphite in the same manner as the surfaces 303 and 305 so that a further description is unnecessary. It will be understood that such tape-supporting surfaces may be smooth flat surfaces or smoothly curved surfaces of revolution, such as frusto-conical surfaces (see Figs. 25 to 28) or spherical surfaces (see Fig. 29), which are uninterrupted radially so as not to interfere with movement of the tape radially on the reel. However, such surfaces are preferably inclined very little relative to the horizontal plane. As herein shown, the reel has the same radial cross section throughout its periphery so that the coil-supporting surfaces of the reel are circumferentially continuous, but it is obvious that a proper support for the tape coil may be provided by means which engages only radially spaced portions of the reel. The term "plate" as used in the specification and claims is intended to cover a coil-supporting member or members having portions that engage only radially spaced portions of the tape coil as well as an annular coil-supporting disc which engages the bottom of the coil throughout its circumference.

In general, the quality of the graphite film on the tape-supporting surface improves, as the particle size of the graphite particles decreases. Good results are obtained where at least ninety percent of the graphite particles have a particle size of not in excess of about ten microns (.010 millimeter) and better results are obtained where the particles are of smaller size.

It will be understood that any of the endless tape reels mentioned herein may be mounted for rotation on ball bearings, a nylon bearing, or any other suitable anti-friction bearing and that the design of the reels may vary considerably for different applications. It will also be understood that the size and type of tape employed may also vary considerably.

Figure 24 shows how the reel 20b and the endless tape 17b mounted thereon may be stored or shipped when the reel is not in use. According to the present invention, a continuous expansible plastic clip or clamping member 307 is provided for mounting on the circumferential edges of the discs 301 and 304 to hold the coil 29b on the reel 20b and to prevent movement of the outer convolutions of the coil off the reel when the reel is not in use and is removed from the magazine. Such an expansible member may have a plurality of inwardly projecting portions spaced along its periphery which extend radially inwardly between the marginal portions of the discs 301 and 304 to limit radial outward movement of the outermost convolution of the tape and may have portions extending between the marginal portions of the disc to prevent movement of the tape radially outwardly beyond said marginal portions.

As herein shown, the expansible clip 307 is in the form of a continuous plastic strip of substantially uniform radial thickness and axial height which is molded so as to be of substantially cylindrical shape between its opposite ends. The clip is provided at its periphery with a pair of grooves 308 and 309 for receiving the marginal portions of the discs 301 and 304, respectively, and may be provided with peripherally spaced portions or the like which project radially inwardly between the discs to limit the radial movement of the tape. As herein shown, the expansible clip 307 has peripherally spaced inwardly projecting tongues 310 and 311 at its opposite ends which project inwardly between the discs 301 and 304 to limit outward movement of the tape and to assist the peripheral grooves 308 in holding the expansible clip on said discs. The tongues may be relatively close together or may be spaced apart a substantial distance less than the external diameter of the reel. Said tongues are of such size and shape as to prevent removal of the clip 307 from the reel until the clip is expanded a substantial amount. Figure 24 shows in solid lines how the resilient clip 307 may be expanded as it is being placed on or removed from the reel 20b and shown in dot-dash lines the position of the clip when it is mounted on the reel.

As shown in Fig. 24, the grooves 308 and 309 have a uniform depth and a uniform width substantially equal to the thickness of the marginal portions of the discs 301 and 304 so as to receive said marginal portions and to engage the circumferential edges of said discs substantially throughout the lengths of the grooves. Said grooves are normally circular and receive the major portion of the periphery of the discs 301 and 304, the portions of the clip 307 between the grooves being shown herein as being imperforate and extending radially between the flat surfaces 303 and 305 of the discs substantially throughout the circumference of the reel to hold the coil 29b in the reel.

Before the clip 307 is mounted on the reel 20b, the endless tape 17b may be wound on the reel to minimize the size of the loop between the innermost and outermost convolutions of the coil 29b. The clip may be mounted with its tongues 310 and 311 spaced circumferentially a substantial distance from said loop so that the tape cannot move through the opening between said tongues and out of the reel. The friction between the clip 307 and the reel 20b effectively resists accidental rotation of the tongues on the reel toward said loop of tape and the inwardly projecting ends of the tongues effectively resist movement of the tape between the tongues.

The one-piece plastic clip is simple, inexpensive and easy to mount on the reels and is very effective in retaining an endless tape in the reel 20b even where the tape is short and the coil 29b has an external diameter substantially less than that of the reel. Since the distance between the tape-engaging surfaces 303 and 305 of the reel may be only slightly greater than the width of the tape, tangling of the tape in the reel 20b during shipping or storing is almost impossible after the clip 307 is mounted on the reel.

Figures 25 and 26 show a magazine $A^4$ which is substantially the same as the magazine $A^3$ except for the bearing means that support the tape reel. The magazine $A^4$ has a rectangular front portion 285 which is identical to the front portion of the magazine $A^3$ and a rounded rear portion 286a which is substantially the same as the rear portion of the magazine $A^3$. The magazine has a cover 288a with a top wall 50c, a continuous marginal wall 289 integral with said top wall, and a downwardly projecting annular portion 291a integral with said top wall and concentric to the semi-cylindrical wall portion 35b.

A flat horizontal bottom 287a is provided parallel to the top wall 50c and the plate 290 which is substantially the same as the bottom wall 287 but has an integral stud 32c which is substantially smaller than the stud 32b. The stud 32c is shaped to receive an annular nylon bearing member 23b, and having a cylindrical portion 325 and a radially extending annular flange portion 326. The bearing member 23b extends the full distance between the top and bottom walls of the magazine so as to be clamped tightly between said walls when the screw 51c is tightened.

A reel similar to the reel 120 or 20b described above or another suitable endless tape reel may be mounted for rotation on the bearing 23b. Figures 25 to 27 show a modified form of tape reel 20c which is substantially the same as the reel 20b described above except that an annular hub portion 323 is provided, the coil-supporting surface of the reel is provided with an inclined portion to reduce the friction between the inner convolutions of the endless tape coil 29c, and the hub of the reel is provided with a concave groove of curved cross section.

The reel 20c has a moulded plastic frusto-conical hub 300a, a generally flat moulded plastic circular bottom plate or disc 301a rigidly connected to said hub and having a cylindrical hub portion 302a integral therewith and an annular hub portion 323 of triangular cross section integral therewith, and a flat moulded plastic circular top plate or disc 304a integral with said hub and parallel to said bottom disc. The cylindrical portion 302a is mounted for rotation on the bearing member 23b as best shown in Fig. 26, which is drawn substantially to scale. If desired, the internal diameter of the portion 302a may be increased so that a thin nylon bearing sleeve may be inserted between the plastic portion 302a and the nylon bearing 23b, but satisfactory results may be obtained without such a sleeve.

The smooth tape-engaging surfaces 306a and 324 of the tapered hub portions 300a and 323, respectively, are coaxial surfaces of revolution and may be symmetrical with respect to the horizontal medial plane of the tape coil. These surfaces are preferably rounded in cross section and may have the same curvature so as to define an annular concave groove of arcuate radial cross section. The friction of the bottom edge of the tape on the curved surface of said groove tends to lift the tape out of the coil and greatly facilitates pulling of the tape from the reel.

The innermost cylindrical convolution of the tape coil 29c engages the curved axially tapered surface 324 of the hub portion 323 near the bottom thereof while simultaneously engaging the oppositely inclined tapered surface 306a of the hub portion 300a near the top thereof. The curved generally frusto-conical hub portion 300a serves to guide the tape from the innermost coil convolution to the front corner portion of the magazine like the frusto-conical hub portion 300 of the reel 20b. The hub portion 323 provides additional friction between the reel and the innermost coil convolution which improves the operation of the reel and also assists in lifting and guiding the tape as it leaves the innermost convolution so as to further improve the operation.

The tape engaging surfaces of the discs 301a and 304a are substantially smooth and uninterrupted from the smooth external frusto-conical surfaces of the hub portions 300a and 323 to the outer marginal edges of the disc. Such surfaces are preferably completely covered by a thin uniform and continuous film 321 of colloidal graphite particles deposited from dispersion in liquid according to the method of the present invention as described above.

Although said tape-engaging surfaces are relatively smooth and relatively flat, they may be tapered somewhat and in the form of a surface of revolution that is inclined at a small angle of perhaps 5 to 15 degrees relative to the horizontal so that the tape 17b must move up an incline as it travels from the outermost to the innermost convolution of the coil 29c. The disc 304a is provided with a smooth flat under surface 305a, like that of the disc 304, which is spaced from the top edge of each convolution of the coil 29c a distance less than half the width of the tape. The disc 301a is also provided with a smooth flat annular top surface 303a parallel to the surface 305a. However, most of the convolutions of the coil 29c are supported by a smooth inclined surface of revolution 320 which extends from the flat surface 303a to the hub portion 323. The surface 320 may be frusto-conical but is preferably curved and slightly convex in cross section, for example as shown in Figure 27. The inclination of the surface 320 is selected so as to minimize friction between convolutions of the tape and to extend the useful life of the tape. The convex dome-like incline of the surface 320 retards slightly the outer convolutions of the tape coil as they travel toward the hub 300a so as to reduce the radial pressure between the tape convolutions near the hub and to reduce the spacing of the convolutions at the center of the coil (which are usually widely spaced where the coil-supporting surface is flat). The reduced radial pressure between the convolutions near the hub facilitates escape of the tape from the innermost coil convolution and substantially improves the performance of the reel.

Since the magazine A⁴ is substantially the same as the magazine A³ of Figs. 20 to 23, it will be apparent that the magazine A⁴ may be mounted on the tape recorder 1c of Fig. 22 and that the circular marginal edge of the bottom disc 301a may be engaged by the reel-driving roller 105b, if such a roller is provided. The magazines A³ and A⁴ may also be mounted on different types of tape recording and reproducing devices. As shown in Fig. 25 the magazine A⁴ is mounted in its normal operating position on the flat horizontal upper surface of the top plate 5c of a recording and reproducing device 1d equivalent to that described in my copending application, Serial No. 500,633, the locating pins corresponding to the pins 203a projecting above the top plate causing the tape guides 41b to swing vertically and to lower the tape into the recess 38b for engagement with the magnetic heads and the feed rolls. The tape recorder 1d has a grooved guide pin 83c, a continuously driven, constant-speed, cylindrical, feed roller or capstan 86c and a spring-pressed, rubber-covered, idler roller 87c corresponding to the elements 83b, 86b and 87b of the recorder 1c, a recording head 7c and a playback head 7d being employed in place of the single magnetic head 7b of said recorder 1c. Since the magnetic transducer heads 7c and 7d are located on the side of the tape remote from the reel 20c, the reel has a "B" wind instead of an "A" wind as with the reel 20b (that is, where the tape has only one magnetic-coated face).

The guide pin 83c and the idler roller 87c are, like the pins 83b and the roller 87b of the recorder 1c, mounted to move toward and away from the tape. The movement of these elements may be effected by a single control knob as suggested by said copending application, Serial No. 500,633. As herein shown, the pin 83c and the idler 87c are mounted on a horizontally movable plate 88c below the top plate 5c, slots 85c and 387 being provided in the top plate to permit the necessary horizontal movement. If desired, a reel-driving roller 105c, similar to the roller 105b of Fig. 22 may be provided to drive the disc 301a, in which case a slot 405 may be provided in the top plate 5c to permit movement of the roller 105c into and out of engagement with the circumferential edge of the disc 301a. However, with the length of magnetic tape normally employed on the reel 20c, it is usually preferable to omit the roller 105c and to rotate the reel solely by the pull on the tape 17b due to the feed rollers 86c and 87c.

As shown in Fig. 25, the guide pin 83c and the idler 87c are in their operating position against the tape so as to hold the tape against the magnetic heads 7c and 7d and against the rotating capstan 86c whereby the tape 17b is fed past the magnetic heads toward the feed rollers and from the innermost to the outermost convolutions of the coil 20c. The guide pin 83c and the magnetic transducer heads 7c and 7d are provided with grooves having a height slightly greater than the width of the tape 17b so as to position the tape vertically as it is fed over the surfaces of the magnetic heads. When the control knob is rotated to move the plate 88c toward the magazine A⁴, the tape is released by the pin 83c and the idler 87c so that the magazine may be removed. It will be apparent that the guide pin 83c may be omitted from the tape recorder 1d and replaced by a stationary or a spring pressed tape guide carried by the magazine if the heads 7c and 7d are mounted for movement horizontally toward the tape.

Figure 28 shows a modified form of reel 20d having a coil-supporting surface similar to that of the reel 20c. The reel 20d comprises a relatively flat circular disc 301b having a flat horizontal upper surface 303b of uniform radial width and an inclined convex annular upper surface 320a, a cylindrical hub portion 302b integral with said disc and of a size to fit on the bearing member 23b, and a frusto-conical hub member 300b concentric to and rigidly mounted on the hub portion 302b. The tape is spirally wound to form a coil 29c having its innermost cylindrical convolution engaging the smooth frusto-conical surface of the hub 300b.

The reel 20d may, for example, be used in the magazine A⁴ to replace the reel 20c. The tapered surface of the revolution 320a has the same shape as the surface 320 of the disc 301a and functions in the same manner to reduce binding of the tape near the center of the coil 29c.

Figure 29 shows one of the better forms of tape reels made according to the present invention. This figure shows a reel 20e which may be used to replace the reel 20b or 20c on the magazine A³ or A⁴, the reel 20e being of a size to fit on the bearing member 23b as shown in Fig. 29 which is drawn to scale. The reel 203 is molded in two annular pieces, the first piece having a generally frusto-conical hub portion 300c and a coaxial integral cylindrical portion 327, and the second piece having a convex generally horizontal circular disc 301c, a coaxial cylindrical portion 302c integral therewith that fits on the cylindrical portion 325 of the bearing member 23b, and an annular hub portion 329 of uniform substantially trapezoidal radial cross section integral therewith. When the reel is assembled the annular portion 329 fits in the annular groove 328 formed in the frusto-conical portion 300c and the portion 302c engages the portion 327 throughout its axial height as is apparent from Figs. 29 and 30. The two pieces are therefore easily cemented together. When the reel is assembled, the smooth, curved, generally frusto-conical, tape-engaging surface 330 of the projecting portion 329 and the similar surface 331 of the hub portion 300c join substantially midway between the top and bottom edges of the innermost cylindrical convolutions 332 of the tape coil 29d. Said innermost convolution engages the surfaces 330 and 331 throughout the circumference of the hub portions 329 and 300c as indicated at 333 and 334.

There is, therefore, almost twice as much friction between the innermost coil convolution and the hub of the reel as there would be if the hub portion 329 were omitted as in Fig. 28, for example. The disc 301c is convex and slightly curved as is apparent from Fig. 29, said disc having a smoothly curved convex surface 320b for supporting the tape coil 29d. The inclined surface 320b tends to reduce the friction between convolutions of the coil like the inclined surfaces 320 and 320a.

The surfaces 330 and 331 are symmetrical with respect to the horizontal medial plane of the tape coil 29d and have a curved radial cross section substantially as shown in Fig. 30 which is drawn to scale. These surfaces are curved generally frusto-conical surfaces of revolution which join to provide an annular groove with a tape-engaging surface of substantially arcuate cross section. This arcuate surface engages the bottom edge of the tape as the tape is pulled from the reel and assists in elevating the tape out of the reel while simultaneously guiding the tape from the reel. It will be understood that the annular groove provided by the surfaces 306a and 324 of the reel 20c may have exactly the same shape as the groove provided by the surfaces 330 and 331 of the reel 20e.

Any of the reels 120, 20b, 20c, 20d and 20e may be used with any of the tape recording and reproducing machines of Figs. 19, 22 and 25, and when so used the loop of tape extending from the inermost to the outermost coil convolution has a length which is normally in the neighborhood of about 4 to 5 times the radius of the reel. The length of this loop usually is about five to ten inches for smaller reels and is preferably no more than 4 or 5 inches greater than twice the diameter of the reel. With normal reels the loop should have a length not substantially greater than one foot.

The surfaces 320, 320a and 320b may be completely covered with colloidal graphite by the method described above, for example, as indicated in Fig. 25. The surfaces 330 and 331 and the corresponding frusto-conical surfaces of the reel 20c may also be completely covered with colloidal graphite.

The coil-supporting surfaces of the reels shown herein engage the bottom of the coil substantially throughout the periphery thereof, but it will be apparent that adequate support may be provided where the coil-supporting plate has radially extending portions that engage only circumferentially spaced portions of the tape coil.

It will be understood that in accordance with the provisions of the patent statutes, variations and modifications of the methods and devices disclosed herein may be made without departing from the spirit of the invention.

Having described my invention, I claim:

1. Feeding apparatus for endless tapes comprising a support, a plate mounted on said support for rotation about a vertical axis and having a smooth radially uninterrupted coil-supporting upper surface, a round axially-tapered hub rigidly connected to said plate for rotation therewith in unison about said axis, a spirally-wound flat coil of endless magnetic-coated tape on the upper surface of said plate having a cylindrical convolution concentric to and engaging said hub, and feeding means for applying a tension to the tape leaving the innermost convolution of said coil and for pulling the tape from the coil at such a speed that said innermost convolution has an angular velocity greater than that of said plate, the sliding friction between said hub and said tape providing the sole drive for said plate, the coil-supporting portions of the reel including graphite surfaces that engage radially spaced bottom portions of the coil around the circumference thereof to support the coil.

2. Feeding apparatus as defined in claim 1 wherein portions of the tape-engaging surfaces of said reel are coated with a film of colloidal graphite particles having a shingle-like formation characteristic of flaked material deposited from dispersion in liquid.

3. Feeding apparatus for endless tapes comprising a support, a plate mounted on said support for rotation about a vertical axis and having a smooth radially uninterrupted coil-supporting upper surface, a round axially-tapered hub rigidly connected to said plate for rotation therewith in unison about said axis, a spirally-wound flat coil of endless magnetic-coated tape on the upper surface of said plate having a cylindrical convolution concentric to and engaging said hub, and feeding means for applying a tension to the tape leaving the innermost convolution of said coil and for pulling the tape from the coil at such a speed that said innermost convolution has an angular velocity greater than that of said plate, the sliding friction between said hub and said tape providing the sole drive for said plate, said hub having a concave annular groove of generally arcuate cross section and engaging the top and bottom edges of the tape forming the innermost coil convolution substantially throughout the circumference of the hub.

4. In combination, a reel having a rotatable plate with a smooth generally horizontal surface rotatable about a vertical axis, a uniform and continuous film of minute graphite particles adhered to said surface and completely covering the tape-engaging portion of said surface, said film having the shingle-like formation characteristic of flaked material deposited from a dispersion in liquid, an endless flexible magnetic tape of substantially uniform width and thickness spirally wound to form a flat annular coil on said surface concentric to said axis and an external loop extending from the innermost convolution of the coil to the outermost convolution, feeding means spaced from said reel and engaging said loop to pull the tape from the innermost convolution of the coil, and means for guiding the tape from the feeding means to the outermost convolution of the coil.

5. In an apparatus for running an endless flexible magnetic tape through an operating zone with the tape forming a spiral coil and with a loop of tape extending from the innermost to the outermost convolutions of the coil, the combination of: a rotatable plate having a smooth generally horizontal surface for supporting said spiral coil, said surface having a thin uniform and continuous electrically conductive film of colloidal graphite deposited from liquid, tape guiding means positioned near the axis of rotation of said plate for guiding the inner convolutions of the coil, tape feeding means for engaging the tape at said loop to pull the tape from the innermost convolution of the coil at a predetermined linear speed, and reel-driving means for rotating said plate at an angular speed substantially greater than that of the outermost convolution and slightly less than that of the innermost convolution.

6. Feeding apparatus for an endless tape comprising a support, a plate mounted on said support for rotation about a vertical axis and having a generally horizontal coil-supporting upper surface, a round axially-tapered hub rigidly connected to said plate for rotation therewith in unison about said axis, a spirally wound coil of tape on the upper surface of said plate having a cylindrical convolution concentric to and engaging said hub, and feeding means for applying a tension to the tape leaving the innermost convolution of said coil and for pulling the tape from the coil at such a speed that said innermost convolution has an angular velocity greater than that of said plate and the sliding friction between said hub and said tape drives said plate, said hub having generally frusto-conical upper and lower portions of curved radial cross section that taper in opposite directions, the upper portion increasing in diameter in the direction of tape withdrawal.

7. Feeding apparatus for an endless tape comprising a rotatable plate having a smooth radially uninterrupted coil-supporting surface, a round axially-tapered hub connected to said plate for rotation therewith about the axis of said hub, a spirally-wound coil of tape on the coil-supporting surface of said plate having an innermost convolution concentric to and engaging said hub, said tape comprising a flexible non-magnetic plastic ribbon having at least one magnetic-coated face and having a thin uniform and continuous electrically-conductive shingle-like film of colloidal graphite particles covering both faces of the tape, a portion of said tape withdrawn from the innermost convolution of the tape coil extending between said plate and said coil, and means for applying a tension to the tape leaving the innermost convolution of the coil to rotate said coil and to impart an angular velocity to said innermost convolution greater than that of said plate, the sliding friction between the rotating coil and said reel driving said hub and said plate at an angular velocity not substantially less than that of the outermost coil convolution, the graphite-coated faces of said tape engaging said coil-supporting surface and the side edges of the rotating coil convolutions as the tape is pulled radially outwardly from the innermost coil convolution.

8. Feeding apparatus as defined in claim 7 wherein means are provided for feeding the tape from the innermost convolution of the tape coil at a predetermined speed including a constant speed feed roll rotatable about a vertical axis spaced from said plates and engaging said tape, and means are provided for rotating said plates and said hub so that the portions thereof engaging the innermost convolution of the tape have an angular speed from about 1 to 10 percent less than the angular speed of the innermost convolution including a constant speed feed roller for engaging the peripheral surface of said first plate.

9. In combination, a tape recording reel comprising a rotatable plate having a smooth generally horizontal upper surface, a coil of endless magnetic sound reproducing tape mounted on the upper surface of said plate for rotation about a vertical axis with the side faces of the tape in each wrap of the coil substantially vertical, means for preventing lateral movement of said coil and for guiding the tape from the innermost wrap of the coil comprising a generally frusto-conical guide member mounted within the coil for rotation about a vertical axis and engaging said innermost wrap substantially throughout the circumference thereof, means for pulling the tape from said innermost wrap at a predetermined linear speed, and motor means for rotating said plate and said guide member so that the portions thereof engaging the innermost convolution of the tape coil have an average peripheral speed from 1 to 10 percent less than the average peripheral speed of said innermost convolution.

10. A flat endless strip of tape of uniform width spiraled to form an annular coil having contacting convolutions, a generally horizontal plate engaging the bottom edge of said tape to support said coil in a substantially horizontal position, means mounting said plate for rotation about the vertical axis of said coil including an annular hub rigidly connected to said plate and engaging the innermost convolution of the tape substantially throughout the circumference thereof to hold the axis of said coil in a fixed position, said hub having a tape-engaging surface substantially in the form of an axially-tapered surface of revolution, said tape-engaging surface having its smaller diameter near the plane of the upper surface of said plate and serving to guide the tape outwardly from the innermost convolution, the friction between the tape-engaging surface of said hub and said tape tending to rotate said plate, means for feeding the tape from the innermost convolution of the coil at a predetermined speed including a constant-speed feed roll rotatable about a vertical axis spaced from said plate and engaging said tape, means for guiding said tape from the innermost convolution thereof to said feed roll and from the feed roll to the outermost convolution of the tape including a vertical guide parallel to said feed roller and said coil, said guiding means directing the tape so that its lower edge remains substantially in a horizontal plane as it passes from said feed roll to said outermost convolution, the loop of tape extending from the innermost to the outermost coil convolution having a length not substantially greater than about five times the radius of said plate.

11. A reel for tape recorders or the like comprising a rotatable plate having a smooth radially uninterrupted roll-supporting upper surface covered with a uniform and continuous film of colloidal graphite, means for supporting said plate in a horizontal position for rotation about a vertical axis through the center of the plate, an endless flat tape strip of uniform width having its major portion coiled to form an annular roll comprising contacting convolutions and its remaining portion extending laterally from the roll and connecting the innermost and outermost convolutions of the roll, the lower surface of said roll having frictional engagement with said upper surface so that rotation of the roll causes rotation of said plate, means for guiding the tape strip from the innermost convolution of the roll, means for holding said roll in a position substantially coaxial with the plate and for holding the innermost convolution of the strip in frictional engagement with the next adjacent convolution at a predetermined point, said roll and said plate being rotated by said frictional engagements when the tape strip is pulled from the innermost convolution of the roll, means for guiding the tape strip to the outermost convolution of the roll whereby the entire strip may be unwound from the inside of the roll while simultaneously being wound on the outside of the roll, means for rotating said plate at a predetermined speed, and means for feeding the tape strip to and from the roll at a predetermined average linear speed slightly greater than the average peripheral speed of the portion of the plate engaging said innermost convolution.

12. Tape feeding mechanism for a sound recording and/or reproducing device comprising a horizontal support, a horizontal circular plate mounted on said support for rotation about a vertical axis and having a coaxial upwardly projecting hub rigidly connected thereto for rotation about said axis, said hub having a smooth generally frusto-conical tape-engaging surface that increases in diameter upwardly away from said plate, said plate having a smooth uninterrupted upper coil-supporting surface extending from said hub to the marginal edge of said plate, a flexible imperforate plastic strip having a uniform width of less than one-half inch and a uniform thickness of not more than a few thousandths of an inch, at least one face of the tape having a coating of finely divided magnetic material bonded thereto and extending the full length and width of the tape and at least one face of the tape having a coating of graphite extending the full length and width of the tape, said tape being spirally wound on said plate around said hub to form a coil having contacting vertical cylindrical convolutions substantially concentric to said hub, the innermost cylindrical convolution engaging the frusto-conical surface of said hub substantially throughout its circumference, guiding means for directing the tape to form a loop with a length of at least about five inches extending from the innermost to the outermost coil convolution, said tape guiding means including a pair of horizontally spaced guide members spaced horizontally from said plate for engaging a portion of the tape in said loop and for holding the tape in a generally straight position as it moves from the first to the second guide member, the straight portion of the tape between the guides having an edge that is substantially horizontal, higher than the upper surface of said plate, and lower than the top of said coil, a pair of feed rollers between said guides for engaging opposite sides of the tape to feed the same, motor means for rotating one of said feed rollers at a constant speed, a magnetic transducer head engaging one side of the tape between said feed rollers and said first guide, the loop of tape extending from the innermost to the outermost convolution having a length not in excess of about one foot and the portion thereof between the innermost convolution and said feed rollers being under tension and engaging the frusto-conical surface of said hub substantially throughout the width of the tape, the sliding friction between said coil and said hub and plate providing the sole force for rotating said reel.

13. Tape feeding mechanism for a sound recording and/or reproducing device comprising a horizontal support, a horizontal circular plate mounted on said support for rotation about a vertical axis and having a coaxial upwardly-projecting hub rigidly connected thereto for rotation about said axis, said hub having a smooth generally frusto-conical tape-engaging surface of generally arcuate cross section that increases in diameter upwardly away from said plate, said plate having a smooth convex uninterrupted upper coil-supporting surface extending from said hub to the marginal edge of said plate, a flexible imperforate plastic strip having a uniform width of less than one-half inch and a uniform thickness of not more than a few thousandths of an inch, at least one face of the tape having a coating of finely divided magnetic material bonded thereto and extending the full length and width of the tape and at least one face of the tape having a coating of graphite extending the full length and width of the tape, said tape being spirally wound on said plate around said hub to form a coil having contacting vertical cylindrical convolutions substantially concentric to said hub, the innermost cylindrical convolution engaging the arcuate surface of said hub substantially throughout its circumference, guiding means for directing the tape to form a loop with a length of at least about five inches extending from the innermost to the outermost coil convolution, said loop having a length not substantially greater than about five times the radius of said plate, said tape guiding means including a pair of horizontally spaced guide members spaced horizontally from said plate for engaging a portion of the tape in said loop and for holding the tape in a generally straight position as it moves from the first to the second guide member, the straight portion of the tape between the guides having an edge that is substantially horizontal, higher than the upper surface of said plate, and lower than the top of said coil, a pair of feed rollers between said guides for engaging opposite sides of the tape to feed the same, motor means for rotating one of said feed rollers at a constant speed, a magnetic transducer head engaging one side of the tape between said feed rollers and said first guide, the loop of tape extending from the innermost to the outermost convolution having a length of about five to ten inches, the major portion of the tape in said loop being located between horizontal planes containing the top and bottom surfaces of said coil.

14. Feeding apparatus for an endless tape comprising a support, a plate mounted on said support for rotation about a vertical axis and having a smooth coil-supporting upper surface, a round axially-tapered hub rigidly connected to said plate for rotation therewith in unison about said axis and increasing in diameter upwardly away from said plate, a spirally-wound flat coil of endless tape on the upper surface of said plate concentric to and slidably engaging said hub, constant speed motor means for rotating said plate, and feeding means for applying a tension to said tape and for pulling the tape from the coil at a substantially uniform speed, said feeding means imparting to the innermost convolution of the coil an angular velocity from about 1 to 10 percent greater than the angular velocity of said plate and said hub.

References Cited in the file of this patent

UNITED STATES PATENTS

| 1,075,487 | Merkel | Oct. 14, 1913 |
| 1,155,776 | Washburn | Oct. 5, 1915 |
| 1,254,272 | Ponon | Jan. 22, 1918 |
| 1,382,040 | Wilson | June 21, 1921 |
| 1,393,985 | Voulgre | Oct. 18, 1921 |
| 1,491,575 | Wilson | Apr. 22, 1924 |
| 1,713,939 | Wingren | May 21, 1929 |
| 2,189,547 | Fisher | Feb. 6, 1940 |
| 2,426,838 | Miller | Sept. 2, 1947 |
| 2,436,032 | Bendfelt | Feb. 17, 1948 |
| 2,443,248 | Hurley | June 15, 1948 |
| 2,468,767 | Lloyd | May 3, 1949 |
| 2,475,036 | Lopez | July 5, 1949 |
| 2,476,928 | Thomas | July 19, 1949 |
| 2,490,771 | Begun | Dec. 13, 1949 |
| 2,529,075 | Dawson | Nov. 7, 1950 |
| 2,559,893 | Nadeau | July 10, 1951 |
| 2,658,843 | Brillhart | Nov. 10, 1953 |
| 2,675,973 | Reed et al. | Apr. 20, 1954 |
| 2,686,637 | Dashiell et al. | Aug. 17, 1954 |
| 2,699,332 | MacKenzie | Jan. 11, 1955 |
| 2,740,628 | Small | Apr. 3, 1956 |
| 2,778,880 | Eash | Jan. 22, 1957 |

FOREIGN PATENTS

| 624,433 | Great Britain | June 8, 1949 |